United States Patent [19]

Ikedo et al.

[11] Patent Number: 4,631,716
[45] Date of Patent: Dec. 23, 1986

[54] OPERATION CHANGEOVER MECHANISM

[75] Inventors: Yuji Ikedo; Masao Kase, both of Saitama, Japan

[73] Assignee: Pioneer Electronic Corp., Tokyo, Japan

[21] Appl. No.: 702,767

[22] Filed: Feb. 19, 1985

[30] Foreign Application Priority Data

Feb. 17, 1984 [JP] Japan .................................. 59-29308
Feb. 28, 1984 [JP] Japan ............................ 59-29787[U]

[51] Int. Cl.$^4$ ........................ G11B 1/00; G11B 25/04
[52] U.S. Cl. .................................................. 369/75.2
[58] Field of Search .................. 369/75.1, 75.2, 77.1, 369/194

[56] References Cited

U.S. PATENT DOCUMENTS

| 3,345,755 | 10/1967 | Ferebee ................................. 33/191 |
| 4,220,404 | 9/1980 | Hofmann et al. .................. 353/27 R |
| 4,347,596 | 8/1982 | Abe et al. ............................ 369/77.1 |
| 4,464,743 | 8/1984 | Takizawa ............................. 369/75.2 |

FOREIGN PATENT DOCUMENTS

| 56-58167 | 5/1981 | Japan ................................... 369/77.1 |
| 56-58168 | 5/1981 | Japan ................................... 369/75.2 |

Primary Examiner—Steven L. Stephan
Attorney, Agent, or Firm—Sughrue, Mion, Zinn Macpeak & Seas

[57] ABSTRACT

An operation changeover mechanism for a disk player or the like which is simple in construction, easy to assemble and inexpensive. An apparatus is provided having first and second members disposed substantially parallel to one another and which are movable relative to each other. A third member is disposed at least partly between the first and second members and is movable in the same direction as the first and second members. First and second recess portions are formed in the respective first and second members in opposite surface, the recess portions being arranged so as to be able to be moved into opposition with the first and second recess portions. A movable member is disposed in the opening portion, engageable with the first and second recess portions. Movement between the third member and either one of the first and second members is restricted in a predetermined direction.

8 Claims, 27 Drawing Figures

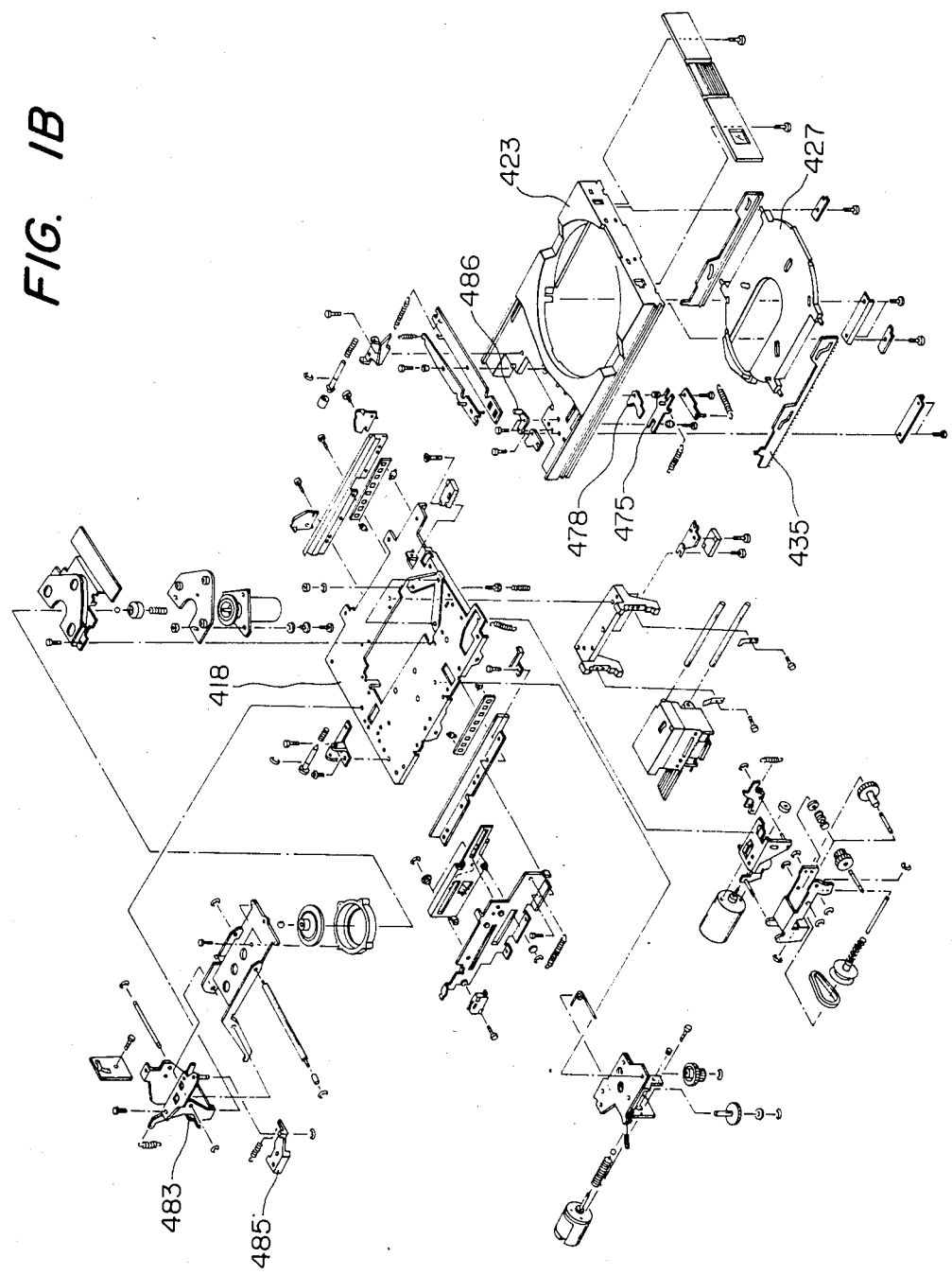

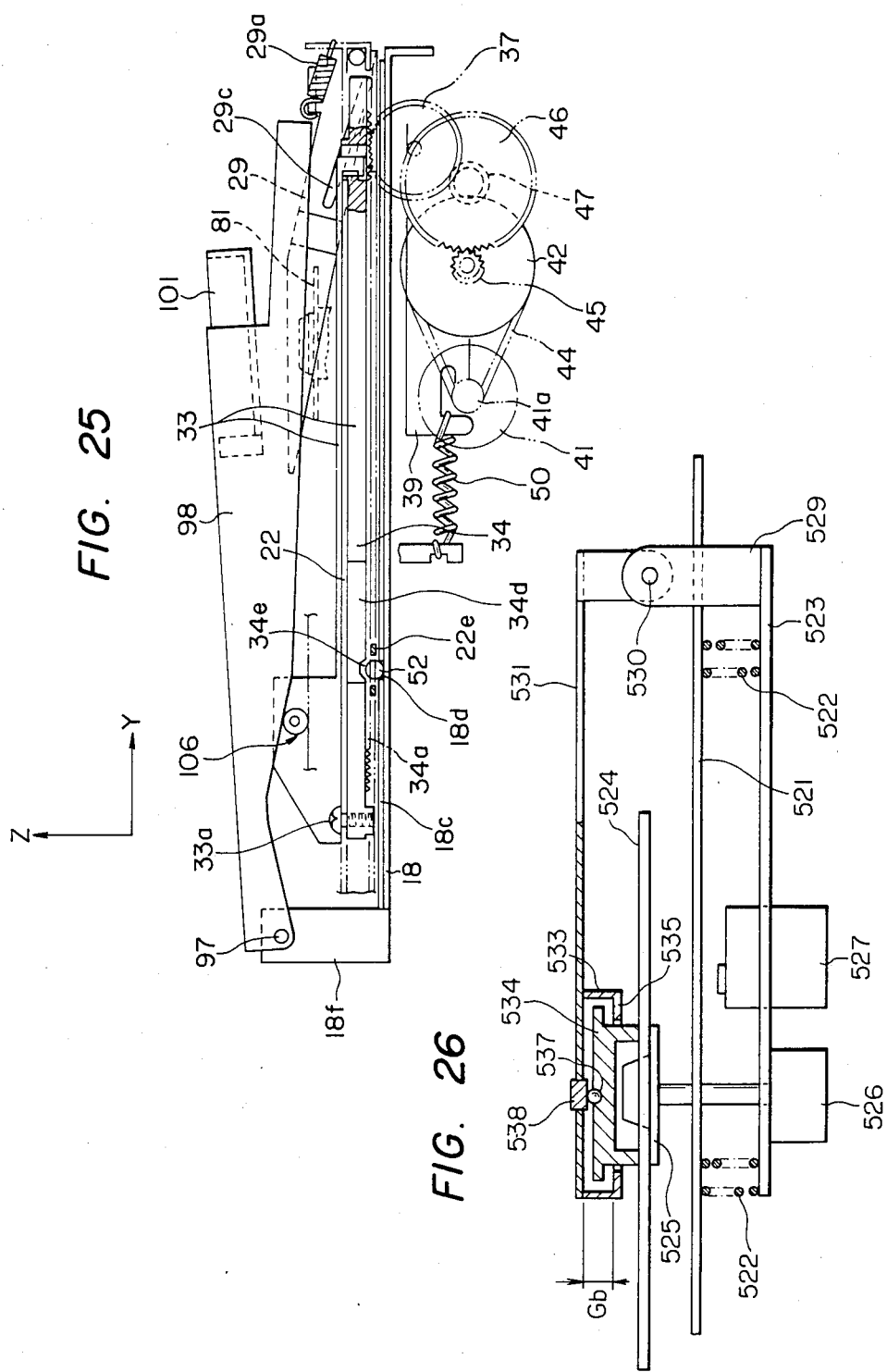

OPERATION CHANGEOVER MECHANISM

BACKGROUND OF THE INVENTION

The present invention relates to an operation changeover mechanism, in an apparatus having three members relatively movable in the same direction to each other, for selectively performing relative movement between a predetermined one of the three members and each of the other two.

For example, Japanese Laid-Open Patent Application No. 53872/1982 discloses an example of such an operation changeover mechanism provided in a bookshelf-type record player. This operation changeover mechanism, as illustrated in FIG. 1A, selectively and alternatively causes either one of a slide base 201 and a rack 205, both being mounted in a player cabinet and movable in the forward/backward direction, to move relative to the player cabinet so as to cause the slide base 201 and a tone arm TA to operate independently from each other. In brief, this operation changeover mechanism is constituted by recess portions 304 and 305 respectively formed in opposite portions in the slide base 201 and the rack 205, a lock lever 307 on which lock pins 307a and 307b engageable with the respective recess portions are projectingly provided at a swing end portion, and a drive mechanism for selectively swing driving the lock lever.

Another example of the operation changeover mechanism which is incorporated into a front loading disk player is proposed in Japanese Utility Model Application No. 152505/1983 filed by the present applicant. As shown in FIG. 1B, this front loading disk player includes a tray 423 attached to a horizontal chassis 418 movable in the forward/backward direction, a container 427 mounted on the tray and movable in the upward/downward direction, a cam member 435 having a cam hole engaged with the container 427 and mounted on the tray 423 and movable in the forward/backward direction, and a drive force applying device for applying a drive force in the forward/backward direction to the cam member. The operation changeover mechanism operates to selectively effect relative movement between the tray 423 and either one of the horizontal chassis 418 and the cam member 435 so as to move the tray 423 relative to the horizontal chassis 418 and move the container 427 relative to the tray 423 from each other. This operation changeover mechanism includes a device having a cam plate 475, an inhibit plate 478 for locking the container 427 to the tray 423 until the tray 423 has been received within a player housing, and an inhibit mechanism, including an inhibit member 483, an inhibit shaft 486, and, an inhibit lever 485, for inhibiting the movement of the tray 423 relative to the horizontal chassis 418 when the tray 423 has been received within the player housing.

In the first example of the operation changeover mechanism as described above, the total number of parts, such as the lock lever 307, the lock lever drive mechanism, etc., is large and therefore the cost is high. Also in the second example of the operation changeover mechanism as described above, the number of parts is large and the cost is therefore high. Further, the operational timing of the lock mechanism and the inhibit mechanism must be precisely controlled, and therefore it is necessary to manufacture the respective members with a high accuracy. In addition, it is difficult to assemble the various members.

The record player devices to which the invention pertains are adapted to receive an optical information recording disk such as a video disk or a digital audio disk either of which has on its surface fine pits in the form of a spiral track in a pattern, in accordance with an information signal, that records the information signal. In order to read out the recorded information signal, a light spot is irradiated on the track while the disk is rotated at a predetermined speed. Changes in the reflected light are converted into an electric signal to thereby reproduce the original information signal. In order to cause the irradiation spot to be focused exactly on the track and to follow the track, it is necessary to prevent external vibration from influencing a spindle motor carrying a turntable and an optical pickup for performing the spot irradiation. A conventional optical information disk player that uses this technology is shown in FIG. 2.

In FIG. 2, a chassis 501 is affixed in a housing (not shown) of a player. A subchassis 503 is suspended by float springs 502 acting as vibration absorbing members on the under surface of the chassis 501. On the subchassis 503 there is affixed a spindle motor 506 carrying a turntable 505 on which a disk 504 is mounted, and there is further provided a carriage carrying a optical pickup (not shown) that is movable in the radial direction of the disk. On the chassis 501 there is projectingly provided a bracket portion 509 on which a movable member 511 is swingably provided through a connecting member 510. Though not shown in the drawing, the connecting member 510 is arranged to be adjustable in the direction of its length. At a swing end portion of the movable member 511 there is rotatably supported a pressing member 512 for clamping the disk in cooperation with the turntable 505. The pressing member 512 is of the type which is attracted to the turntable 505 by magnetic force.

As described above, in the conventional optical information recording disk player, the carriage 507 carrying the pickup and the spindle motor 506 is fixed on the subchassis 503 which is held by the chassis 501 through the float springs 502, and a clamp mechanism is provided on the chassis 501 fixed to the housing. That is, the spindle motor 506 (and hence the turntable 505) and the clamp mechanism are relatively movable within the range of movement of the float springs 502 in the play mode of the disk. Accordingly, it has been necessary to make considerably large the dimension Ga indicated in FIG. 2, that is, a gap formed at the pressing member 512, in order to release the abutting condition between the movable member 511 and the pressing member 512 to enable the pressing member to rotate together with turntable 505 in the play mode of the disk. This problem should be solved to make the player thin overall.

To ensure the dimensional accuracy in relative position between the turntable 505 and the pressing member 512, it has been necessary to increase the accuracy of the position of the spindle motor 506 relative to the subchassis 503 and the positions of the subchassis 503 and the clamp mechanism relative to the chassis 501 and the dimensional accuracies of these components, resulting in a high cost. Further, for example, in order to obviate the necessity of exact positioning of the clamp mechanism on the chassis 501, it has been necessary to provide an extra part such as the connecting member 510 as a position adjusting device, as shown in FIG. 2.

SUMMARY OF THE INVENTION

The present invention is adapted to solve the problems described above. An object of the invention is to provide an operation changeover mechanism which is simple in construction, which is inexpensive, and which is easy to assemble.

The operation changeover mechanism according to the present invention comprises a front loading recorded disk playing apparatus having a housing with an opening in a front panel, a chassis within the housing on which operational electrical apparatus and mechanical apparatus are mounted, a record carrying means for supporting a record disk, the record carrying means being adapted to move between a first position within the housing and a second position extended from the housing, the record carrying means being mounted to the chassis by an extendable track apparatus which is adapted to support the record carrying means in its first position and its second position, the improvement comprising: a stationary base means, the stationary base means being mounted on and stationary with respect to the chassis in a first planar direction, the stationary base further comprising a first rail means integrally formed with the base means and aligned in the direction of movement of the record carrying means between its first and second positions, the first rail means further including a first recess means; an extendable rail means, the extendable rail means having a second rail means aligned in the direction of movement of the record carrying means between its first and second positions, the second rail means further including a second recess means; a moveable base means, said moveable base means forming a part of said record carrying means and being at least partly disposed between the first rail means and the second rail means and the moveable base means being adapted for slidable movement relative to the first and second rail means as the record carrying means moves between its first and second positions, the moveable base means further including an opening therein; a detent means, the detent means being contained within the opening in the moveable base means; the first recess of the first rail means, the second recess of the second rail means and the opening of the moveable base means being in alignment when the record carrying means is in the first position and the first and second recess means being adapted to resistively contain the detect means whereby the moveable base means is locked with respect to the second rail means and relative movement between the moveable base means and the first rail means is allowed until the record carrying means arrives at the first position, and after the arrival of the record carrying means at the first position, relative movement between the second rail means and the moveable base means is allowed and the moveable base means is locked with respect to the first rail means.

A further object of the present invention is to provide an optical information recording disk player which may easily be made thin and which is inexpensive.

An optical information recording disk player according to a further embodiment of the present invention includes a first support member fixed to a housing; a second support member mounted on a first support member through vibration absorbing means; a carriage carrying optical pickup means that is mounted on the second support member and is moveable in the radial direction of a disk; a spindle motor fixed to the second support member and carrying a turntable thereon the turntable being adjusted to receive a recording disc; and a clamp mechanism for clamping the disk, the clamp mechanism including a pressing member for performing a disk clamping operation in cooperation with the turntable, and a movable member attached to the second support member and movably relative to the turntable for rotatably supporting the pressing member.

BRIEF DESCRIPTION OF THE DRAWINGS

FIGS. 1A, 1B and 2 illustrate conventional changeover mechanisms;

FIGS. 24 and 25 are diagrams used for explaining the operation of the invention disk player; and FIG. 26 is a schematic diagram of another embodiment of a disk player of the invention.

DESCRIPTION OF THE PREFERRED EMBODIMENTS

Referring to the accompanying drawings, a front loading disk player provided with an operation changeover mechanism according to the present invention will be described.

Figure 3:
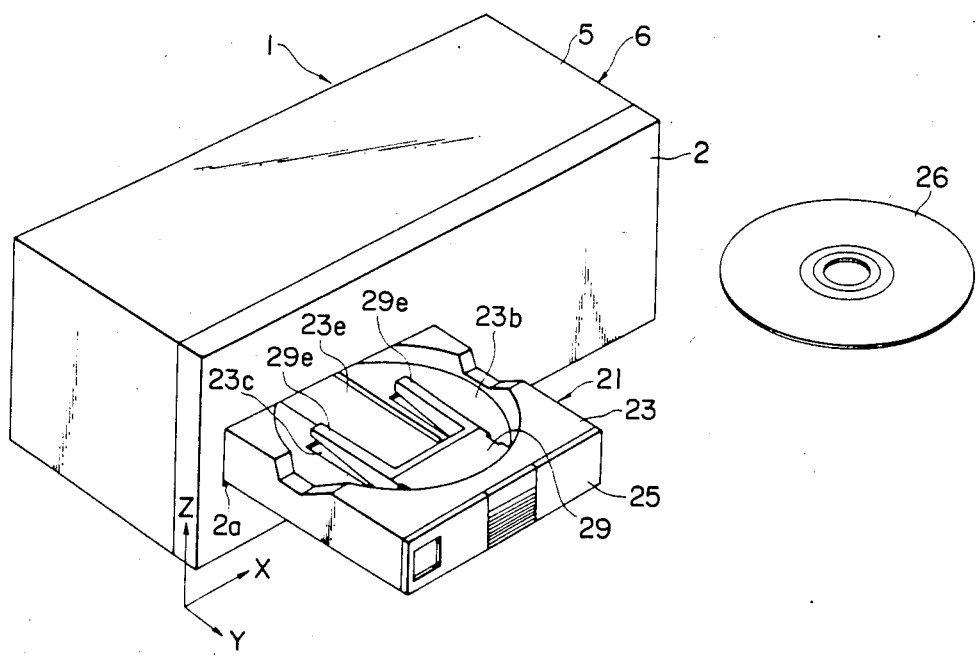
FIG. 3 is a perspective view showing a front loading disk player according to the present invention.
Figure 4:
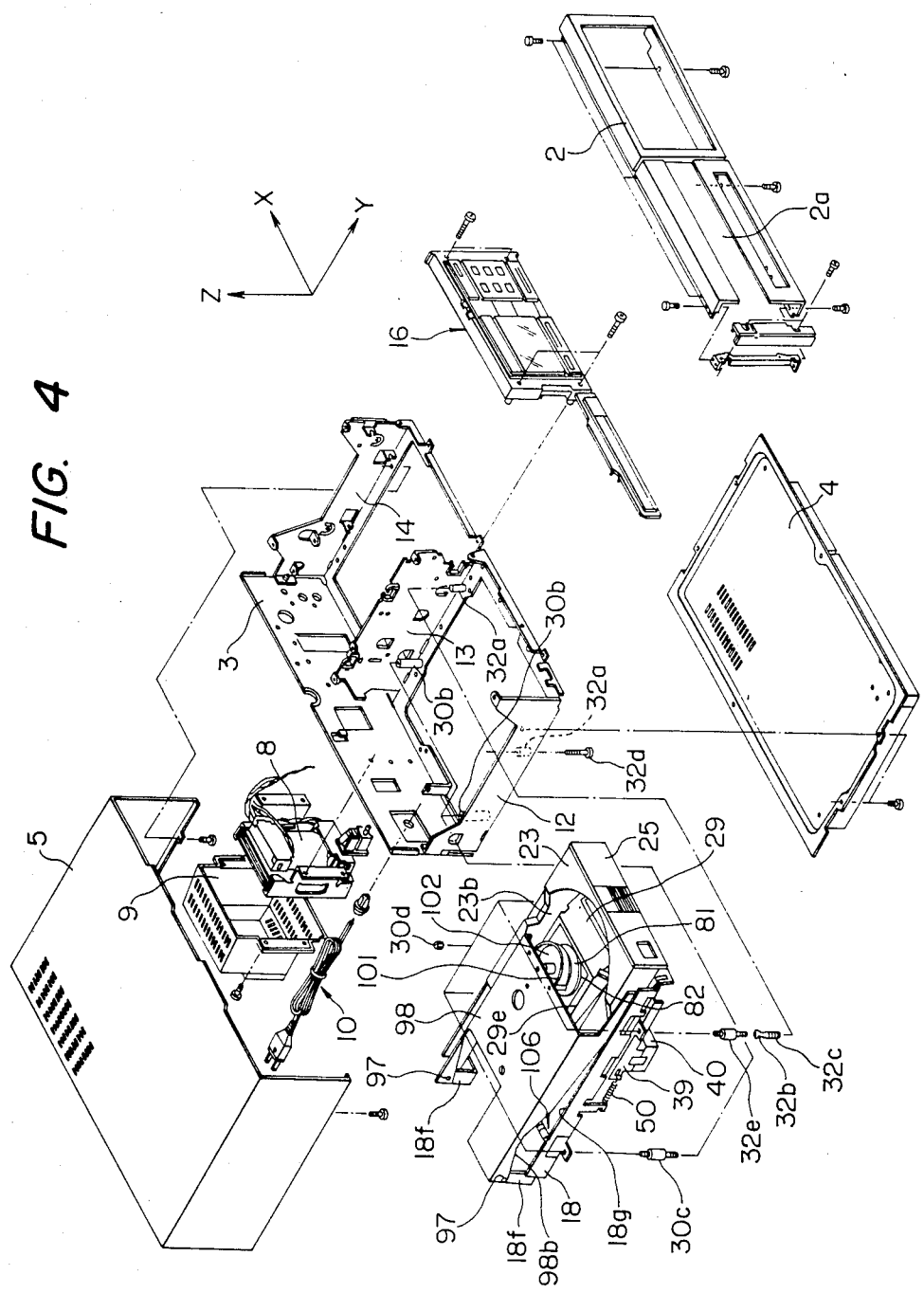
FIGS. 4 and 5 are exploded perspective views each showing portions of the internal construction of the front loading disk player of FIG. 1.
Figure 5:
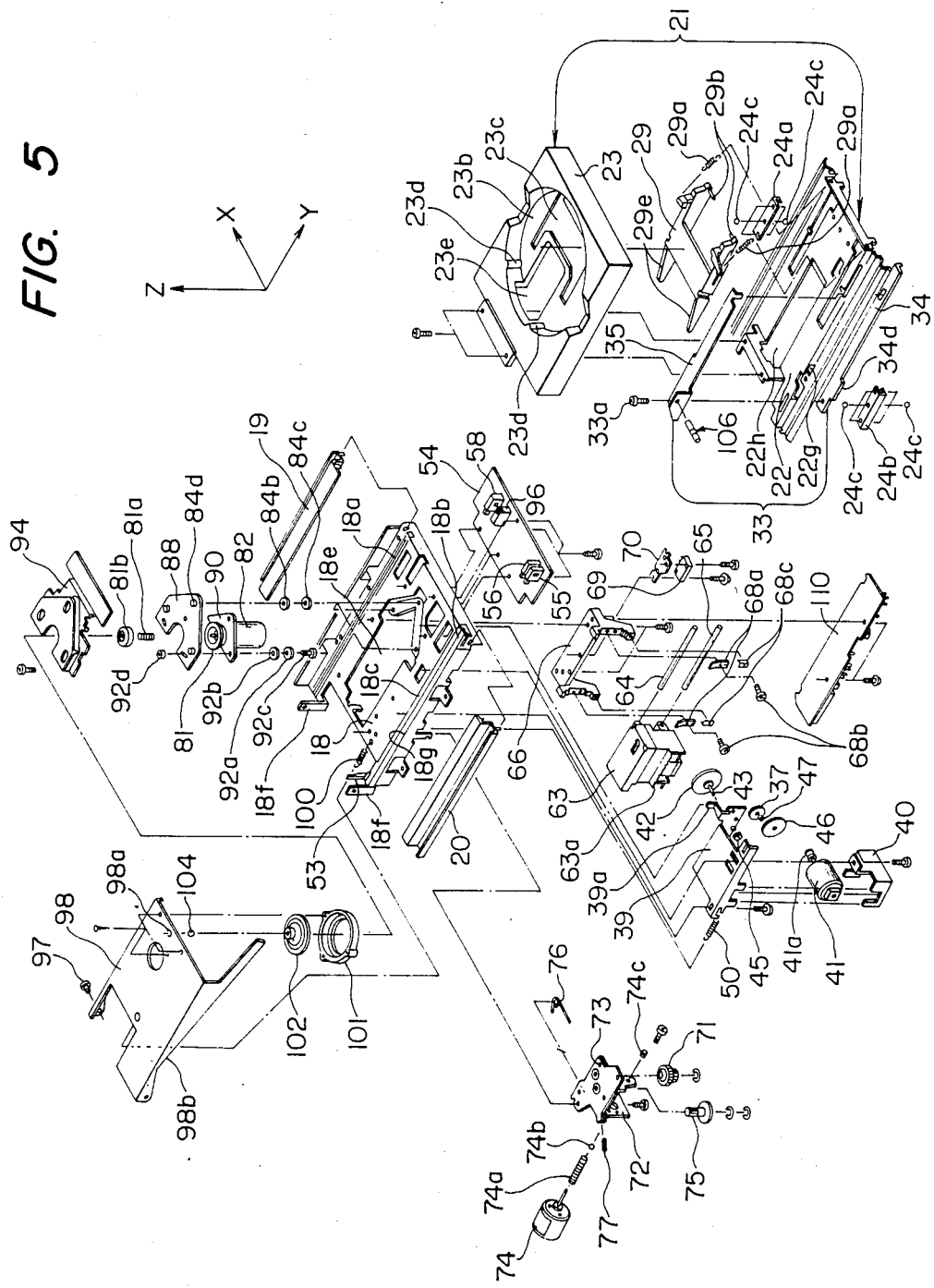
Figure 6:
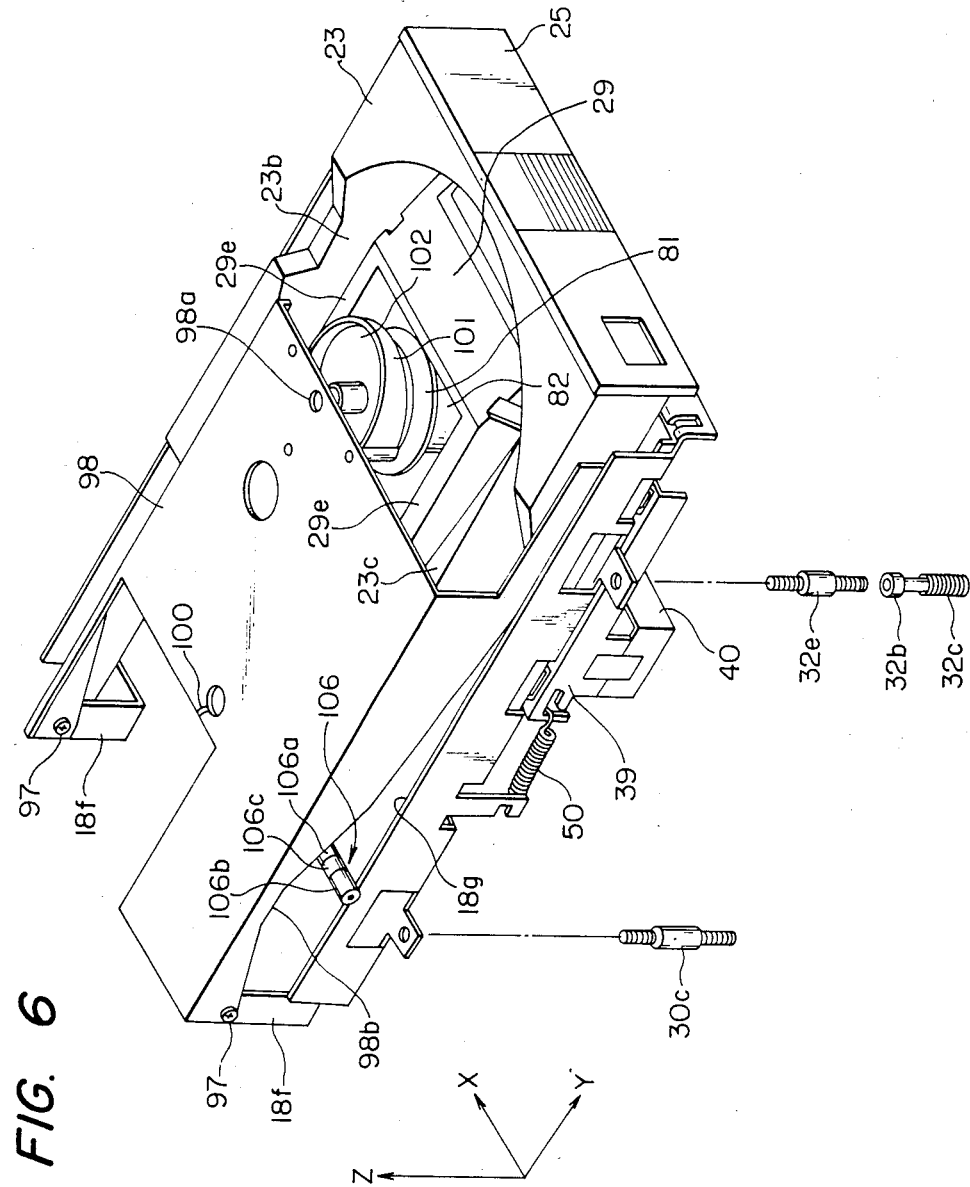
FIGS. 6 to 11 are detailed perspective views each showing parts depicted in FIGS. 4 and 5.

In the drawings, reference numeral 1 generally designates a front loading disk layer. For example, as shown in FIGS. 3 and 4, a front panel 2, a rear panel 3, a bottom plate 4, and a side plate 5 are connected with each other by a plurality of screws or the like to constitute a housing 6. A rectangular, laterally elongated opening portion 2a is formed in the front panel 2 so as to allow a disk carrying portion (described later) to outwardly project from the housing. A transformer 8 and a cover 9 covering the transformer are provided at the side portion thereof. As apparent from FIG. 4, three vertical chassis 12, 13 and 14 are fixedly provided on the rear panel 3 and an operation portion 16 for performing play operations is fixed on the respective front portions of these vertical chassis.

As shown in FIGS. 4 to 6, 8 and 12 to 16, a horizontal chassis 18 acting as a support member is disposed between the vertical chassis 12 and 13. As apparent from FIGS. 5, 8, 12 and 13, a pair of rail portions 18a and 18b extending in the forward/backward direction substantially over the entire length of the horizontal chassis 18 are formed in the vicinity of the right and left end portions of the horizontal chassis 18. The left rail portion 18a is formed to have a trapezoidal shape in cross-section when cut in the left/right direction, while the right rail portion 18b is formed to have a substantially humplike shape in cross-section in the same direction. A pair of pressing members 19 and 20, which are made of a steel plate or the like and which extend in the forward/backward direction, are provided on the horizontal chassis 18 at the left and right outside the respective rail portions 18a and 18b. A tray 21 is provided between the pressing members. The tray 21 is constituted by a slide base 22, made by working a steel plate or the like, and a cover member 23 made of resin or the like applied over the slide base 22. The slide base 22 is sandwiched by the rail portions 18a and 18b and the pressing members 19 and 20 through retainers 24a and 24b, which are prevented from coming off by removing preventing portions 22a, 19a, and 20a formed at the respective opposite ends of the slide base 22 and the pressing members 19 and 20, respectively. A plurality of bearing members 24c are rotatably fitted in predetermined upper and lower positions of the respective retainers. That is, the tray 21 constituted by the slide base 22 and the cover member 23 is arranged to be slidable on the horizontal chassis 18 in the forward/backward direction. A style plate 25 adapted to be fitted with the opening 2a of the front panel 2 to close the same is attached to the front end of the cover member 23.

Reduction in cost is achieved with this structure in that, as described above, the slide base 22, and hence the tray 21, is guided in the forward/backward direction by the arrangement of the rail portions 18a and 18b formed integrally with the horizontal chassis 18 through pressing or the like. Also, the flexible pressing members 19 and 20 do not require a high accuracy in manufacturing. In many previously developed disk players, a pair of rail members made of rigid bodies are provided separately from the horizontal chassis 18, in place of the above-mentioned rail portions 18a and 18b, so that the tray is supported by both the rail members through given bearing members. In such an arrangement, however, there is a problem that the tray becomes impossible to slide smoothly unless the accuracy in manufacturing the rail members is made so high, resulting in a high cost.

Figure 7:
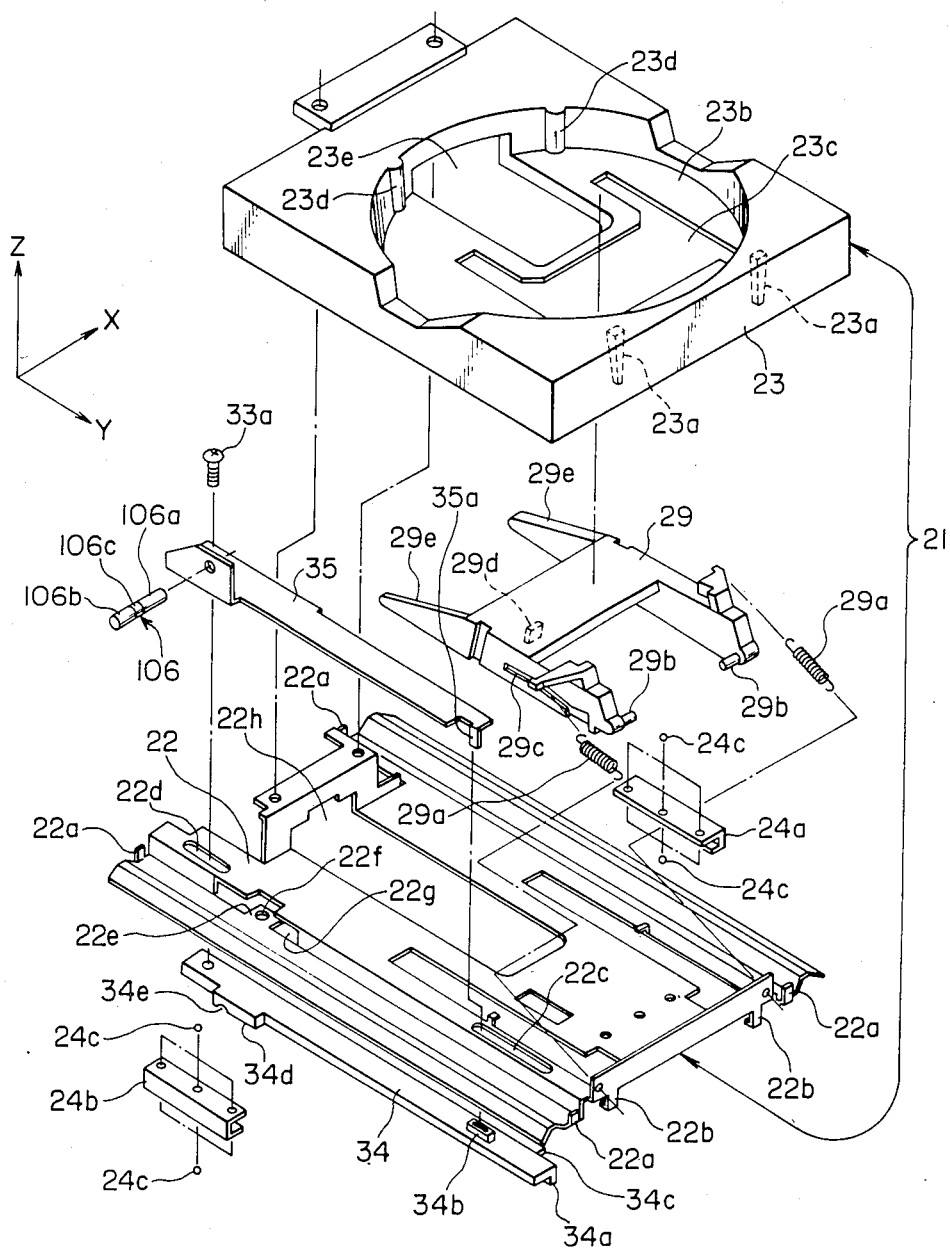

Referring to FIG. 7, a container 29 is attached to the tray 21 at its front end portion, vertically swingably within a predetermined range and arranged to project outside the housing 6 together with the tray 21 and to carry a disk 26 to be played in cooperation with the tray 21. A pair of coil springs 29a is provided in the vicinity of the front end portion of the container 29 so that the container 29 is urged upward by these coil springs. The container 29 constitutes a disk carrying portion together with the tray 21. The disk 26 is of the type wherein a signal is recorded and read out using laser light and which has an outer diameter of about 12 cm.

As apparent particularly from FIG. 7, a pair of pivotal axes 29b integrally formed with the container 29 are respectively sandwiched by a pair of support portions 22b formed at the front end portion of the slide base 22, each having a substantially U-shaped cross-section and being fitted outside the pivotal axes in the front-to-rear direction, and a pair of left and right support protrusions 23a formed on the cover member 23 such that they are positioned in the vicinity of the support portions 22b when the cover member 23 is attached to the slide base 22. In such an arrangement, the pivotal axes 29b of the container 29 are supported at the same time that the cover member 23 and the slide base 22 are assembled. Thus, the assembly work is simplified.

Similarly in FIG. 7, a cylindrical recess portion 23b having a vertical central axis is formed in the cover member 23. A slot portion 23c is formed in the bottom portion of the cylindrical recess portion 23b, and the swing end portion of the container 29 is inserted through this slot portion 23c. A pair of left and right disk guide protrusions 23d, which extend vertically and which are adapted to abut on the outer periphery of the disk, are formed on the peripheral surface of the cylindrical recess portion 23b and at the swing end portion side of the container 29.

Referring again to FIGS. 4, 6, 12 and 13, the left and right rear end portions of the horizontal chassis 18 are attached to a pair of post-like members 30b by means of nuts 30d through dampers 30c made of rubber or the like, the post-like members 30b being attached to the vertical chassis 12 and 13 by screws 30a. A rear leg mechanism for supporting the rear end portion of the horizontal chassis 18 and for positioning the same rear end portion on the housing is constituted by the screws 30a, the post-like members 30b, the dampers 30c, etc. As shown also in FIG. 16, a pair of cylindrical members 32a disposed in the vicinity of the opening portion 2a of the front panel 2 on an axial line substantially perpendicular to the moving direction of the above-mentioned disk carrying portion are fixed on the vertical chassis 12 and 13. In each of the cylindrical members 32a there is slidably fitted a shaft member 32b having an upper end portion enlarged in diameter and a lower end portion formed cylindrically. A coil spring 32c is compressingly provided between the upper end portion of the cylindrical member 32a and the enlarged-diameter portion of the shaft member 32b. A thread portion is formed at the inner periphery of the lower cylindrical portion of the shaft member 32b and a screw 32d is engaged with the thread portion. The reaction force of the screws 32d is received by the vertical chassis 12 and 13, and the screws 32d are arranged so as to be adjustable from the outside of the housing 6. The left and right front end portions of the horizontal chassis 18 are attached to the upper ends of the shaft members 32d by nuts of the same kind as the nuts 30d through dampers 32e made of rubber or the like. A front portion leg mechanism for supporting the front end portion of the horizontal chassis 18 and for positioning the same front end portion on the housing 6 is constituted by the cylindrical members 32a, the shaft members 32b, the coil springs 32c, the dampers 32e, etc. The height of the front portion leg mechanism can be adjusted by rotating the screws 32d from outside of the housing 6.

As shown in FIGS. 5, 7 and 12 to 14, a movable member 33 is provided at the right end portion of the slide base 22 of the tray 21, movable slidably in the forward/backward direction relative to the tray 21. Here, the horizontal chassis 18 is referred to as a first member and the movable member 33 and the tray 21 are referred to as a second and a third member, respectively. The movable member 33 is constituted by a rack member 34 having a rack portion 34a formed along substantially its entire length at the lower portion of the rack member and disposed in contact with the lower surface of the slide base 22, and a plate 35 is disposed in contact with the upper surface of the slide base 22. The rack member 34 is made of resin. The plate 35 is fabricated from a steel plate through working. A bent portion 35a formed at the front end portion of the plate 35 is fitted into the protrusion 34b formed at the front end portion of the rack member 34 so that the respective front end portions of the rack member 34 and the plate 35 are coupled with each other. The respective rear end portions of the member 34 and the plate 35 are connected with each other by a screw 33a. The protrusion 34b and the screw 33a are respectively slidably engaged with respective holes 22c and 22d formed in the slide base 22 and extending in the forward/backward direction so that the movable member 33 constituted by the rack member 34 and the plate 35 are made movable relative to the slide base 22. An engagement protrusion 34c slidably engaged with a cam hole 29c formed in the right side surface of the container 29 is formed at the front end portion of the rack member 34. The forward half portion of the cam hole 29c is tapered so as to be inclined upwardly in the forward/backward direction so that the container 29 swings vertically as the rack member 34, and hence the movable member 33, moves in the forward/backward direction.

As shown in FIGS. 4 to 6, 9, 13 and 14, a bracket 39, rotatably supporting a gear 37 meshed with the rack portion 34a formed on the rack member 34, is disposed on the lower surface of the horizontal chassis 18 and at the front end, right-hand portion thereof and is attached to the horizontal chassis 18 movably in the moving direction of the slide base 22, that is, in the forward/backward direction. A motor 41 is mounted on the bracket 39 through a sub-bracket 40, and a shaft 43 is rotatably provided with a pulley 42 being fixed on one end of the shaft 43. The pulley 42 is coupled with a small pulley 41a fixedly attached to an output shaft of the motor 41 through a belt 44 (see FIG. 13). A gear 46 meshed with a small gear 45 fixedly attached to the other end of the shaft 43 is rotatably supported on the bracket 39. A small gear 47 is fixed to the gear 46 coaxially therewith, meshing with the gear 37. The bracket 39 is urged in the direction of storing the slide base 22, that is, in the backward direction.

A deceleration mechanism is constituted by the gear 37, the small pulley 41a, the pulley 42, the shaft 43, the belt 44, the small gear 45, the gear 46, and the small gear 47. A driving power supply mechanism for supplying driving power to the rack portion 34a, that is, to the movable member 33, is constituted by the deceleration mechanism and the motor 41.

Next, a description will be given regarding a lock/release mechanism which locks the container 29 with respect to the tray 21 until the slide base 22 (and hence the tray 21) upon the arrival of the tray 21 at the receiving position while locking the tray 21 to the horizontal chassis 18.

Figure 12:
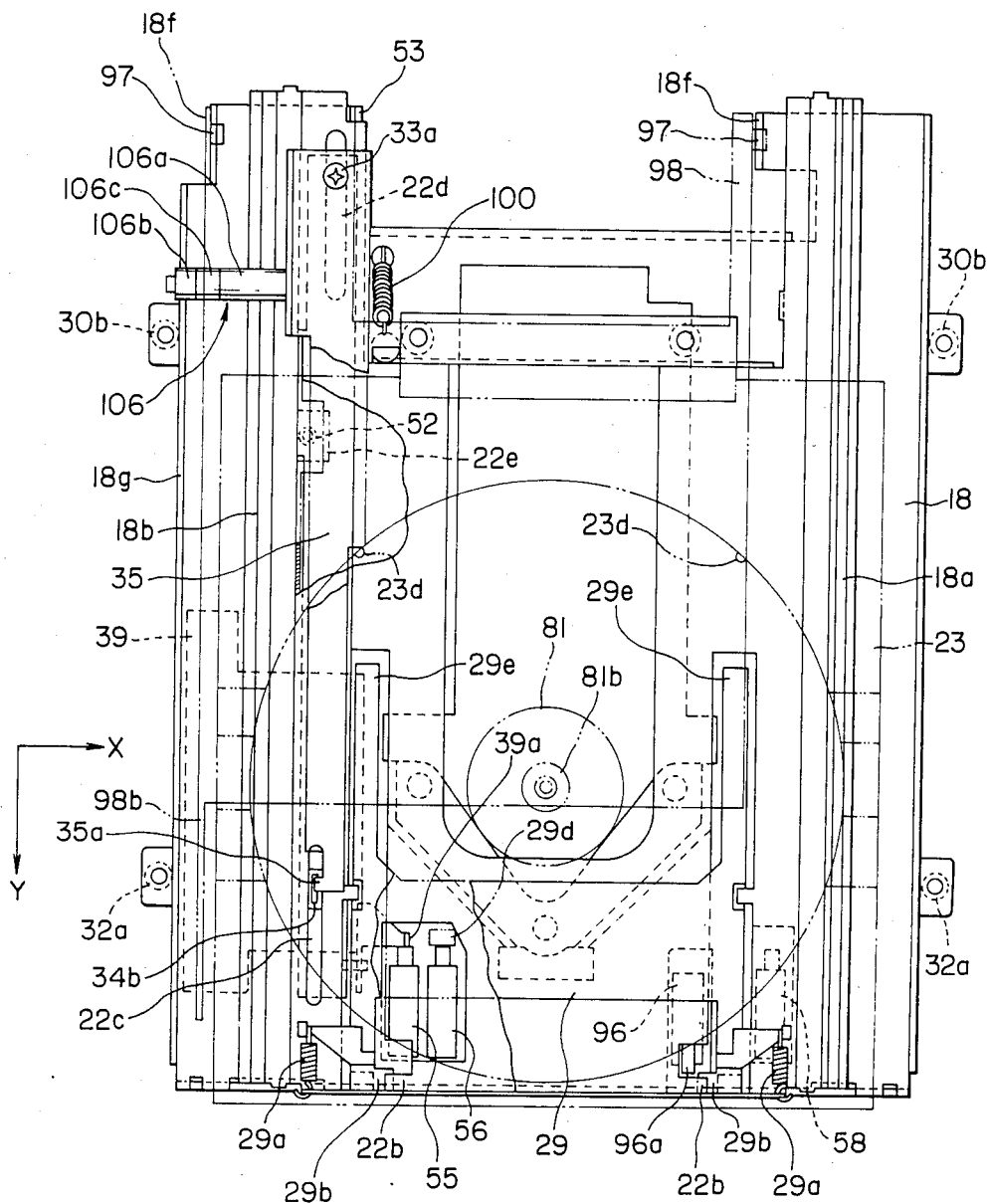
FIGS. 12 to 14 are a plan view, a front view, and a right side view, respectively, each showing a part of the above-mentioned internal construction and including partial cross sections.
Figure 13:
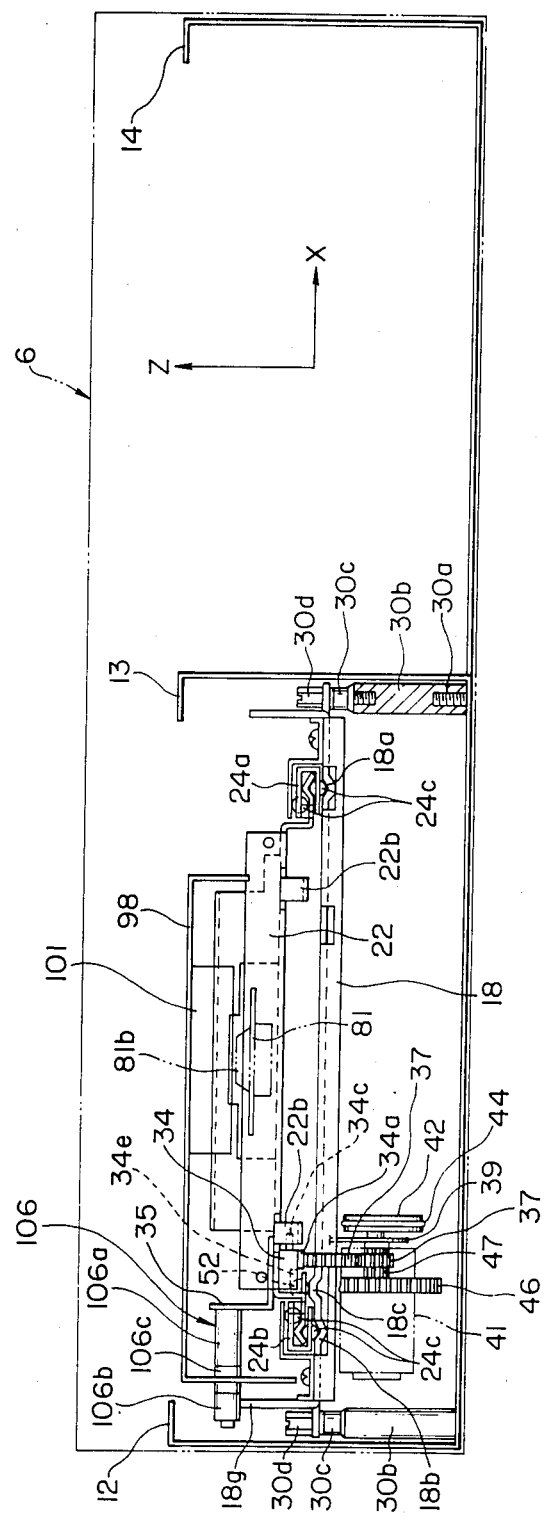

As shown in FIGS. 7, 8, 13, and 14, a slide portion 18c, projecting upward and extending linearly in the forward/backward direction, is formed at the right end portion of the horizontal chassis 18 and at the lefthand end of the rail portion 18b, and a protrusion 34d is provided on the right side surface of the rack member 34 corresponding to the slide portion 18c. First and second recess portions 18d and 34e are respectively formed in the slide portion 18c and the protrusion 34d in the respective surfaces thereof opposing each other such that the first and second recess portions come into opposition to each other when the tray 21 is in the receiving position within the housing 6. As shown in FIG. 12, a small enlarged portion 22e projecting leftward is formed at the right end portion of the slide base 22. The enlarged portion 22e is located between the slide portion 18c and the protrusion 34d, and an opening portion 22f (see FIG. 7) is formed in the enlarged portion 22e such that it is adapted to come into opposition to the first and second recess portions 18d and 34e. A spherical movable member 52 engageable with the first and second recess portions 18d and 34e is disposed within the opening portion 22f. Here, the dimension da indicated in FIG. 14, that is, the distance between the respective opposing surfaces of the protrusion 34d of the rack member 34 and the slide portion 18c of the horizontal chassis 18 within the range of relative movement therebetween, is made smaller than the outer diameter of the movable member 52. Further, the dimension db, indicated also in FIG. 14, that is, the distance between one of the respective opposing surfaces of the protrusion 34d and the slide portion 18c and the bottom surface of one of the first and second recess portions 18d and 34e opposing the above-mentioned one surface, is made slightly larger than the outer diameter of the movable member 52.

When the first recess portion 18d, the second recess portion 34e, and the opening portion 22f come into opposition to each other on the same axis, the rear end portion of the slide base 22 constituting the tray 21 engages with a restriction protrusion 53 formed at the rear end of the horizontal chassis 18 so as to limit the movement of the tray 21 relative to the horizontal chassis 18 in the tray receiving direction (backward direction). Further, when the first recess portion 18d, the second recess portion 34e, and the opening portion 22f come into opposition to each other, the front end of the protrusion 34d formed on the rack member 34 constituting the movable member 33 comes into contact with the front edge of an opening portion 22g which is formed in the slide base 22 in the vicinity of the right end portion thereof such that the protrusion 34d is inserted therethrough to thereby limit the movement of the movable member 33 relative to the tray 21 in the tray projection direction (forward direction).

A lock/release mechanism which locks the container 29 with respect to the tray 21 until the slide base 22, and hence the tray 21, has reached the receiving position within the housing 6, and which releases the locked condition between the container 29 and the tray 21 upon arrival of the tray 21 in the horizontal chassis 18, is constituted by the first recess portion 18d, the second recess portion 34e, the opening portion 22f, the movable member 52, the opening portion 22g, and the restriction structure made up of the opening portion 22g and the restriction protrusion 53 for restricting the movement of the tray 21 relative to the horizontal chassis 18 in the tray receiving direction and restricting the movement of the movable member 33 relative to the tray 21 in the tray projecting direction when the first recess portion 18d, the second recess portion 34e, and the opening portion 22f come into opposition to each other. In view of the relative movement of the three members including the horizontal chassis 18 in addition to the two members, that is, the tray 21 and the movable member 33, the restriction of the movement of each of the tray 21 and the movable member 33 relative to the horizontal chassis 18 when the first recess portion 18d, the second recess portion 34e, and the opening portion 22f come into opposition to each other acts to limit the relative movement in one predetermined direction, that is, in the forward direction, among the horizontal chassis 18 (the first member), the movable member (the second member), and the tray (the third member).

Figure 8:
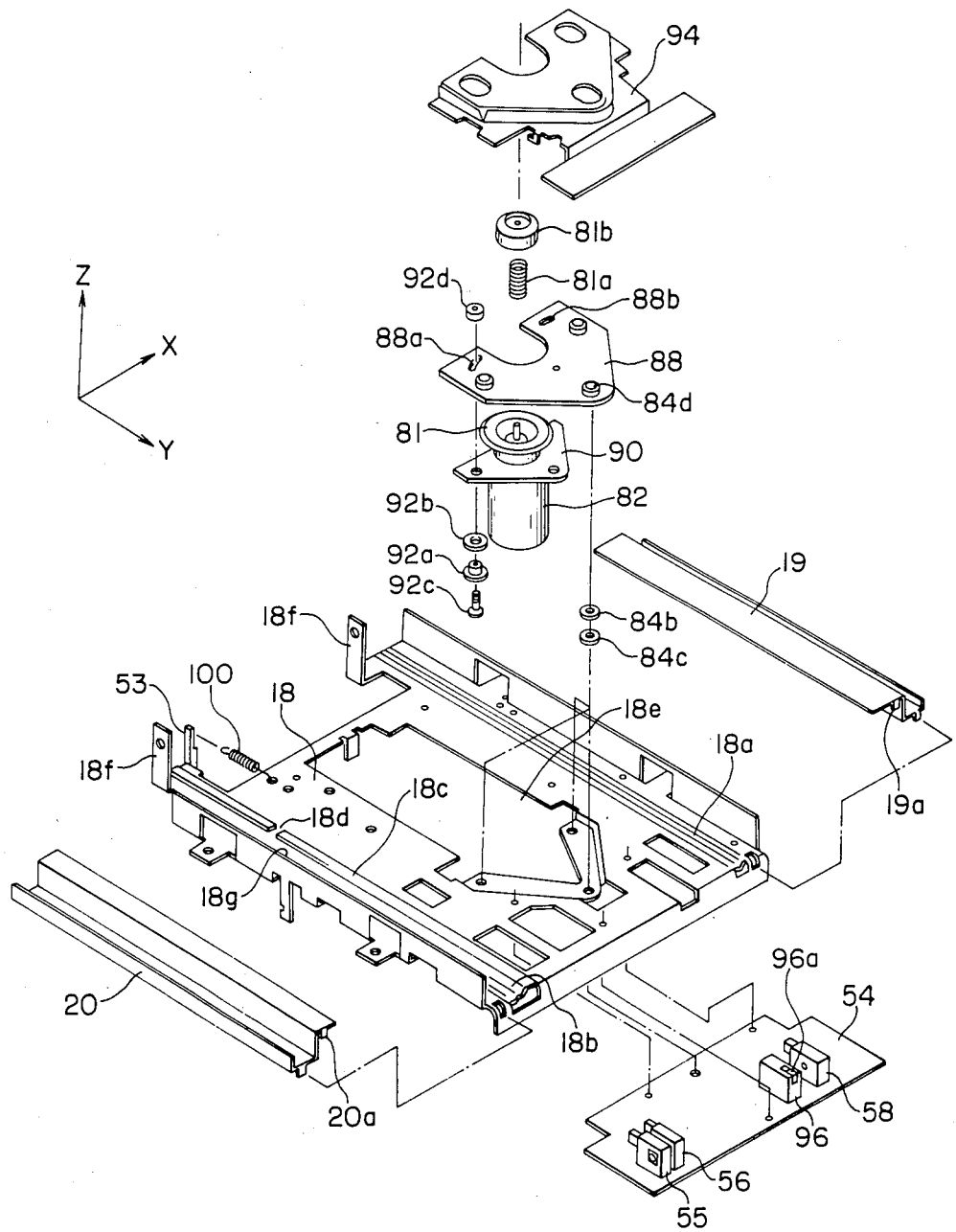
Figure 14:
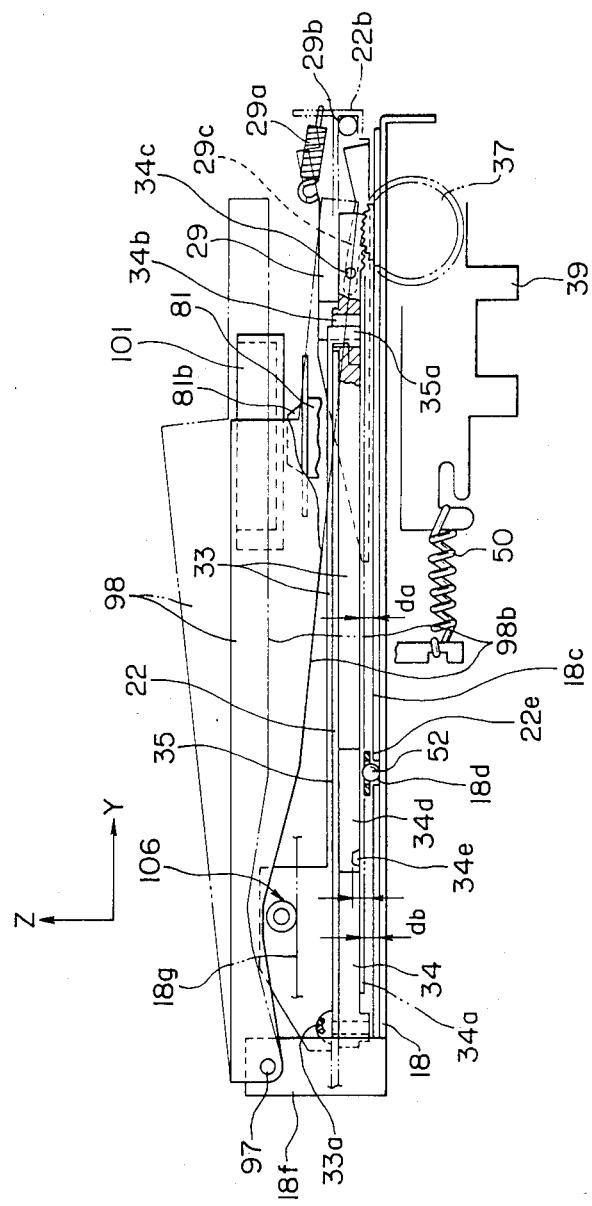
Figure 15:
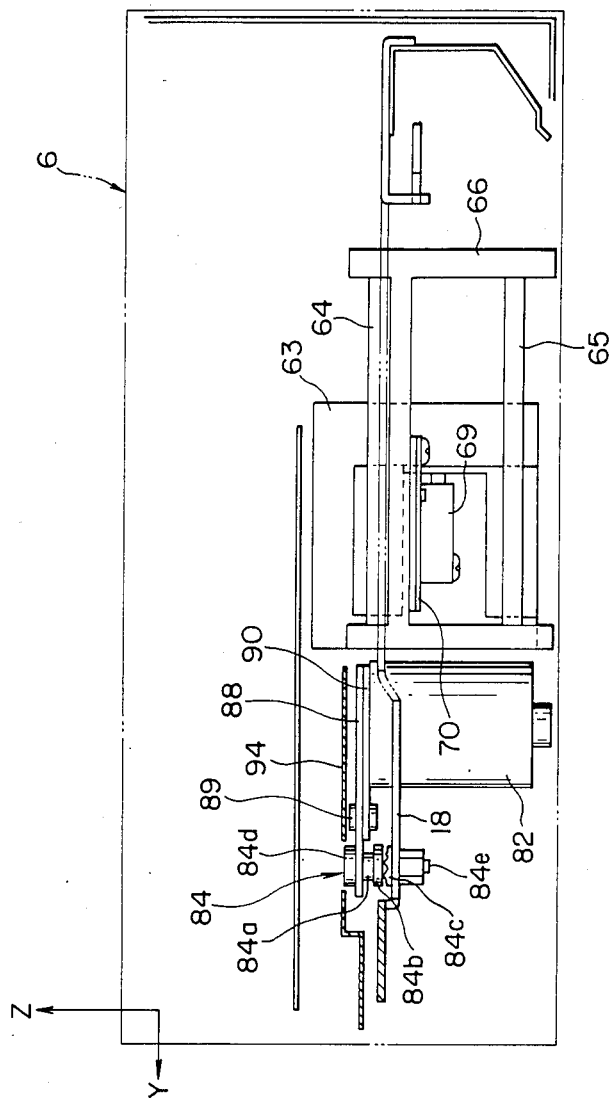
FIGS. 15 to 23 are detailed diagrams each showing a part of the above-mentioned internal construction.
Figure 16:
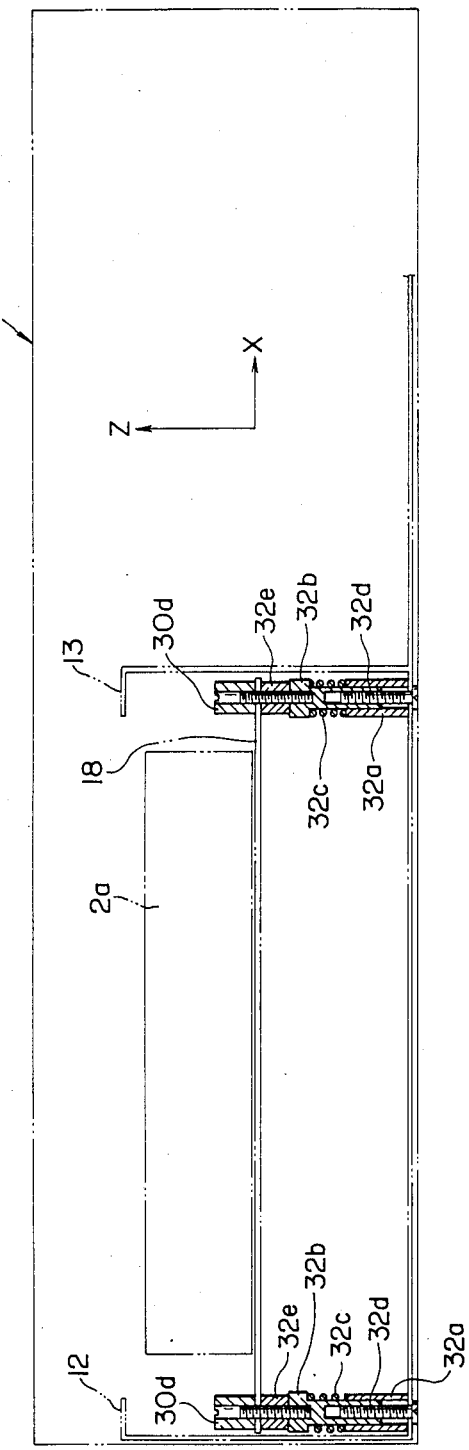

The shape of the movable member 52 is not restricted to be spherical, and may be, for example, be post-like. It becomes possible with the invention to use a very inexpensive but hightly accurate part such as a commonly used steel ball as the movable member. Also, the assembly of the lock/release mechanism is simplified. As apparent particularly from FIG. 14, the second recess portion 34e is trapezoidal in cross-section. Even if the rack member 34 formed with the second recess portion 34e is made of a relatively soft material such as resin, the contact pressing angle of the second recess portion 34e with the movable member 52 can be made constant by properly forming the second recess portion 34e engaged with the movable member 52 made of a hard material so that the operation of the movable member 52 can be stable. Further, as shown in FIGS. 8 and 14, the first recess portion 18d formed in the slide portion 18c of the horizontal chassis 18 has a channel-like cross-section. Although the horizontal chassis 18 is made from a steel plate by working, the forming of the first recess portion is made extremely easy by making the cross-section of the first recess portion 18d channel-like.

Figure 9:
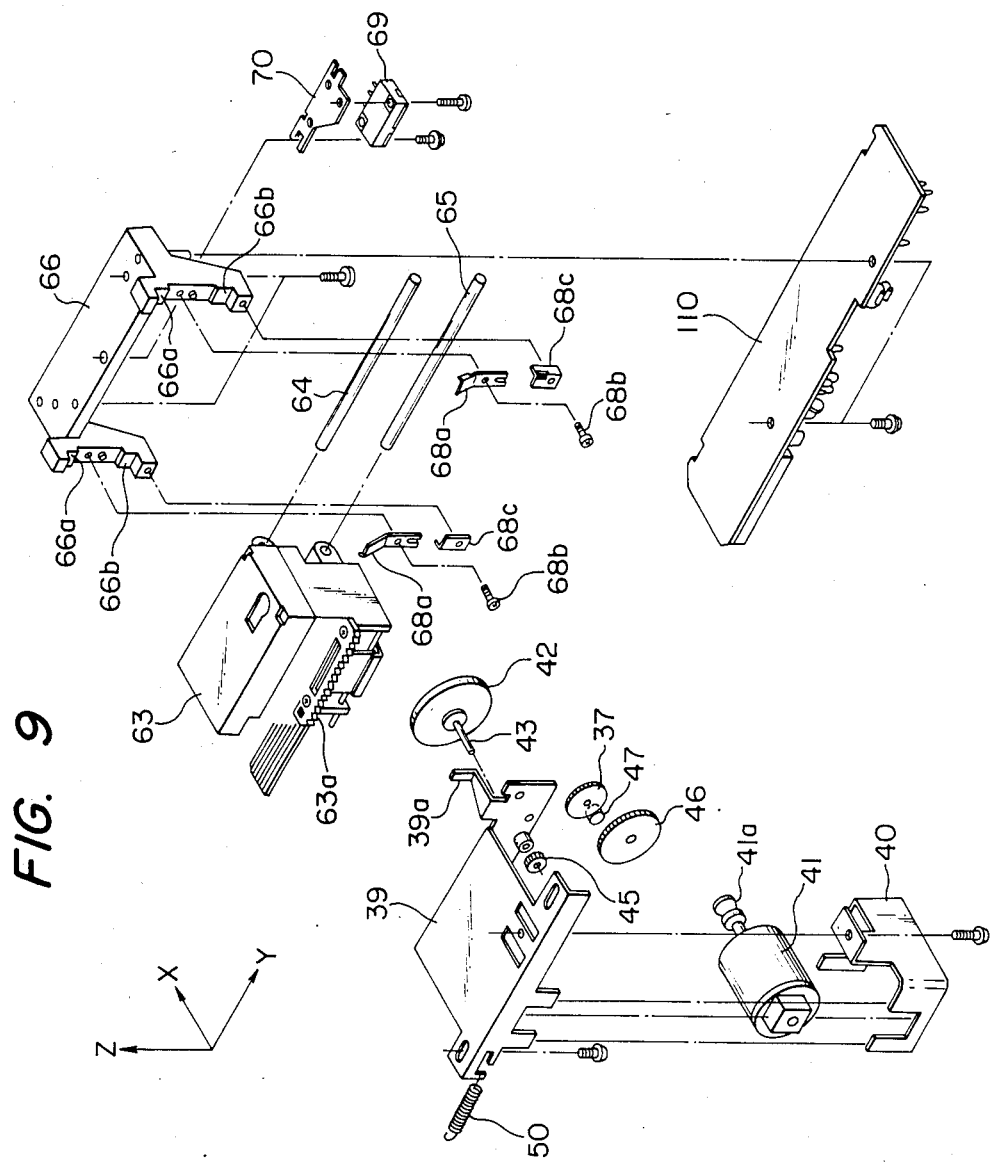

Referring again to FIGS. 5, 8 and 12, a substrate 54 is fixed to the under surface at the front end of the horizontal chassis, and a pair of detection switches 55 and 56 are fixed to the upper surface of the substrate 54 at the right-hand portion thereof. As shown in FIG. 9, a bent portion 39a engageably with the detection switch 55 is formed at the front end portion of the bracket 39 provided on the under surface of the horizontal chassis 18. That is, the detection switch 55 operates when the bracket 39 moves forwardly. As shown in FIGS. 7 and 12, an engagement protrusion 29d which engages with the detection switch 56 when the container 29 swings to the lower limit position is provided on the under surface of the container 29. The lower and upper swing restriction portions of the container 29 are respectively referred to as the operation and inoperation positions of the container. A disk on a disk mounting surface 29e on the swing end portion of the container 29 is mounted on a turntable (described later) when the container has reached the above-mentioned operation position. On the substrate 54, there is provided also a detection switch 58 for detecting the arrival of the disk carrying portion constituted by the tray 21 and the container 29 at the projecting position, that is, the disk exchange position, where the tray 21 constituted by the slide base 22 and the cover member 23 is projected from the housing, by the fact that the switch 58 has engaged, for example, with a part of the slide base 22 when the tray 21 reaches the above-mentioned projecting position.

A stop/positioning mechanism for stopping the operation of the driving power supplying mechanism (the motor 41 and associated components) in response to the detection of the arrival of the disk carrying portion (the tray 21) at the receiving position within the housing 6, and for positioning the disk carrying portion within the housing 6, and for positioning the disk carrying portion, is constituted by the lock/release mechanism (the first recess portion 18d and the second recess portion 34e, the bracket 39, the detection switch 55, the small peripheral parts associated with those components). Further, a stop/reversing mechanism for stopping the operation of the driving force supplying mechanism (the motor 41, etc.) when the disk 26 has reached the play position and for causing the driving force supplying mechanism to operate reversely when a load is applied to the tray 21 to prevent the tray 21 from being received within the housing, is constituted by the stop/positioning mechanism and the detection switch 56. The detection switches 55 and 56 are hereinafter referred to as first and second detection switches.

A disk conveying mechanism, for carrying the disk to be played and for displacing the disk in a first predetermined direction (forward/backward direction) and in a second predetermined direction (vertical direction) to thereby convey the disk into the play position, is constituted by the disk carrying portion constituted by the tray 21 (the slide base 22 and the cover member 23) and the container 29, the support mechanism (the horizontal chassis 18 acting as a support member), the front portion leg mechanism (the rear portion leg mechanism which includes a post-like member, etc., and the cylindrical member 32a, etc.), the retainers 24e and 24b, the bearing member 24c, the pressing members 19 and 20, the movable member 33 (the rack member 34 and the plate 35), the driving force supplying mechanism (the gear 37, the motor 41, etc.), the stop/reversing mechanism (the detection switch 56 and the stop/positioning mechanism), and small peripheral members associated with those components.

Next, a description will be given about a play mechanism provided in the housing 6 for performing the playing of record disks.

As shown in FIGS. 5, 9, 15, 17 and 19, a carriage 63 carrying a optical pickup (not shown) for reading information from the disk 26 is disposed on the under surface of the horizontal chassis 18. A rack portion 63a is provided on the carriage 63 at its right end, the rack portion 63a extending in the forward/backward direction, that is, in the direction of movement of the carriage. A pair of parallel guide shafts 64 and 65 extend in the horizontal direction (forward/backward direction in this case) vertically separated from each other. The shafts 64 and 65 are inserted into the left end of the carriage 63, that is, at the opposite side to the rack portion 63a with respect to the carriage. The carriage 63 is guided by the guide structure constituted by these guide shafts 64 and 65. A support base 66 is fixedly provided on the under surface of the horizontal chassis 18. A pair of abutting surfaces 66a and 66b formed parallel to each other are provided at the opposite ends on the right side of the support base 66. The upper one 64 of the pair of guide shafts is fixed to the abutting surface 66a by a pair of front and rear fixing members 68a and a pair of screws 68b. The lower guide shaft 65 abuts the abutting surface 66b and is fixed by a pair of front and rear fixing members 68c. A detection switch 69, which detects the movement limit position of the carriage 63 in response to the engagement of the switch 69 with a part of the carriage, is attached to the support base 66 through an adjustment member 70 for adjusting the position of the detection switch 69.

A support mechanism, supporting the above-mentioned guide structure constituted by the guide shafts 64 and 65, is constituted by the horizontal chassis 18, the support base 66, etc.

Openings 18e, 22h and 23e are formed in the horizontal chassis 18, the slide base 22, and the cover member 23, respectively, within the range of movement of the carriage 63 at positions so as to not block irradiation of the recording face of the disk from the above-mentioned optical pickup.

Figure 10:
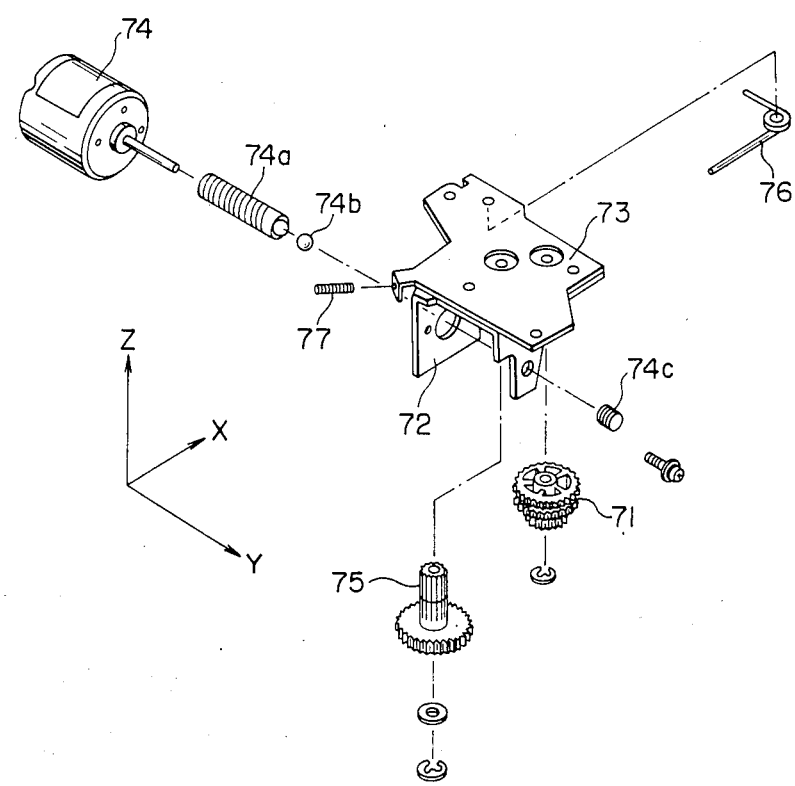
Figure 11:
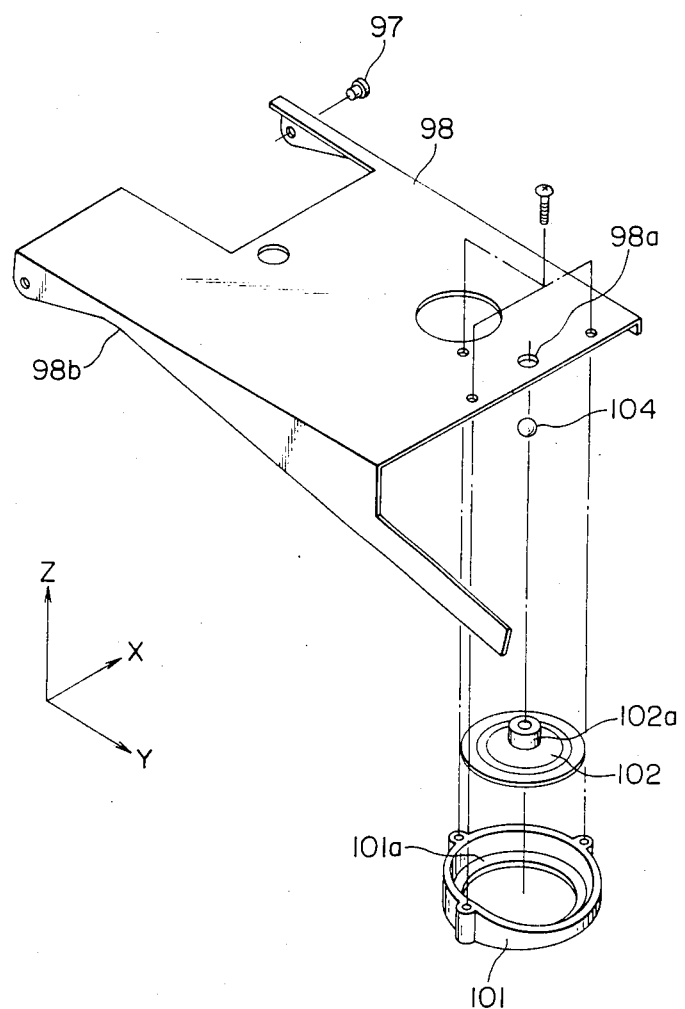

As shown also in FIG. 10, a holding member 72 for rotatably supporting, at its front end, a gear 71 meshed with the rack portion 63a formed on the carriage 63 is disposed on the under surface of the horizontal chassis 18. The holding member 72 is swingably attached to an intermediate plate 73, fixedly attached on the under surface of the horizontal chassis 18 through a shaft (not shown) inserted in a hole (not shown) formed in the intermediate plate at its rear end portion. A motor 74 having an output shaft to which a worm 74a is fitted, is mounted on the holding member 72. The worm 74a is supported by the holding member 72 through a spherical bearing member 74b and a bearing member 74c.

There is provided a worm wheel 75 meshed with the worm 74a as well as the gear 71.

A drive source for driving the gear 71 is constituted by the motor 74, the worm 74a, the worm wheel 75, etc. A driving force supply mechanism for supplying the rack portion 63a, and hence the carriage 63, with driving force, is constituted by the above-mentioned drive source and the gear 71. The holding member 72 for holding the gear 71 and the above-mentioned drive source is urged by a spring member 76 in the direction along which the gear 71 approaches the rack portion 63a. In order to prevent useless swinging motion of the holding member in the direction along which the gear 71 and the rack portion 63a separated from each other, a screw 77 engageable with the holding member 72 is screwed into the intermediate plate 73.

As shown in FIGS. 5, 6, 8, 12 to 15, and 20 to 23, a support wheel 81, which is the turntable for carrying the disk 26, is disposed on the movement line of the carriage 63. The support wheel 81 is rotatingly driven directly by a spindle motor 82. The support wheel 81, vertically rotatably provided, has a movable portion 81b upwardly biased by a coil spring 81a. A leg mechanism 84 disposed at the opposite side of the carriage 63 with respect to the spindle motor 82 and extending vertically along an extension line of the movement locus of irradiation onto the disk 26, is attached to the horizontal chassis 18. As apparent particularly from FIG. 22, the leg mechanism 84 is constituted by a substantially cylindrical bolt member 84a rotatably fitted to the horizontal chassis 18 and having a lower-end enlarged-diameter portion, a nut 84b threadedly engaged with the bolt member 84a, a spring washer 84c fixing the bolt member 84a to the horizontal chassis 18 in cooperation with the lower-end enlarged diameter portion of the bolt member 84a, a cap 84d threadedly engaged with the upper end portion of the bolt member 84a, and a screw 84e threadedly engaged with the female thread portion formed in the inner periphery of the bolt member 84a and adapted to abut at its top end the inner surface of the cap 84d. For assembly, the nut 84b and the screw 84e are loosened first while the cap 84d is fixed, and then the bolt member 84a is rotated to adjust a pair of leg mechanisms 85 and 86 disposed substantially symmetrically with respect to an extension line of the movement locus of the optical axis of the above-mentioned irradiation, extending in the same direction as the leg mechanism 84, and provided on the horizontal chassis 18. These leg mechanisms 85 and 86 are arranged quite in the same manner as the leg mechanism 84 such that the height can be adjusted. A first adjusting member 88 is fixed on the top end of each of the leg mechanisms 84, 85 and 86. A support shaft 89 is fixed on the first adjusting member 88 on the extension line of the movement locus of the above-mentioned optical axis and in the vicinity of the leg mechanism 84. The support shaft 89 extends substantially parallel to the optical axis, that is, vertically, and it swingably supports a second adjusting member 90 which carries the spindle motor 82. As apparent particularly from FIGS. 20, 21 and 23, a cylindrical pin 92a having an enlarged-diameter lower-end portion is inserted through a swinging end portion of the second adjusting member 90. A screw 92c passes through the pin 92a and projects from the first adjusting member 88. A nut 92d is threadedly engaged with the screw 92c projected up from the first adjusting member 88. An elongated hole 90a is formed in the second adjusting member 90 at a position separated from the pin 92a by a predetermined distance, and a shaft member 93 is inserted through the elongated hole. Preferably, the pin 92a and the shaft member 93 are disposed on the same circumference with the pivotal point of the second adjusting member 90 as the center. The shaft member 93 is constituted by a screw portion 93a, an enlarged-diameter portion 93b, and a hexagon head portion 93c, the screw portion 93a and the hexagon head portion 93c being coaxial. The axis of the enlarged-diameter portion 93b is biased relative to the axis of the screw portion 93a and the hexagon head portion 93c by a predetermined distance. A cover 94 is fixedly provided on the horizontal chassis 18 to cover the first and second adjusting members 88 and 90. The screw portion 93a passes through a hole 88b formed in the first adjusting member 88 and projects upwardly from the first adjusting member 88. A nut 93d is threadedly engaged with the screw portion 93a projecting up from the first adjusting member 88. That is, for assembly, the nuts 92d and 93d are loosened and the shaft member 93 rotated while grasping the hexagon head portion 93c so that the second adjusting member 90 can be swung relative to the first adjusting member 88.

A fixing arrangement for fixing the second adjusting member 90 at a desired swing position relative to the first adjusting member 88 is constituted by the pin 92a, the spring washer 92b, the screw 92c, the nut 92d, the shaft member 93, etc. The leg mechanisms 84, 85 and 86, the first adjusting member 88, the support shaft 89, the second adjusting member 90, and the fixing arrangement are included in the above-mentioned support mechanism constituted by the horizontal chassis 18, etc.

The play mechanism for performing record disk play is constituted by the support wheel 81, the spindle motor 82, the carriage 63, the driving force supply mechanism (the motor 74, etc.) which supplies driving force to the carriage 63, the holding member 72, the support mechanism (the horizontal chassis 18, etc.), the guide structure constituted by the guide shafts 64 and 65, and small peripheral members associated with those components.

Next, a description will be presented regarding the way in which irradiation from the above-mentioned optical pickup is stopped when the disk carrying portion constituted by the tray 21 and the container 29 is projected from the housing 6.

As shown in FIGS. 5, 8, 12 and 17, an irradiation stop switch 96 is provided on the substrate 54 fixed to use under surface of the horizontal chassis 18. The irradiation stop switch 96 is disposed between a laser light emitting device of the above-mentioned optical pickup and an electric power source circuit, and is arranged such that, when the switch 96 is turned off, power supply to the light emitting device is cut off so that irradiation by the light emitting device is stopped. The irradiation stop switch 96 is of the normally closed type, and as is apparent from FIG. 17, an actuator 96a of the irradiation stop switch is normally engaged with the under surface of the slide base 22 so that the contact of the irradiation stop switch is force to open when the tray 21 (the slide base 22, etc.) projects from the housing 6.

Next, a description will be given with respect to a clamp mechanism for clamping the disk 26 conveyed to the play position.

As shown in FIGS. 4 to 8 and 11 to 14, a swing member 98 is swingably attached through pins 97 to a pair of upwardly extending bent portions 18f formed at the rear end right and left portions of the horizontal chassis 18.

The position indicated by a solid line in FIG. 14, that is, the position where a pressing member (described later) comes into contact with the disk mounted on the support wheel 81, is referred to as the clamping position of the swing member 98, while the position indicated by a double-dot/chain line in the same figure is referred to as the nonclamping position of the swing member 98. The swing member 98 swings between the clamping and nonclamping positions. A coil spring 100 with one end connected to the horizontal chassis 18 is connected to the swing member 98 at its rear end portion so that the swing member 98 is urged toward the above-mentioned clamping position. A cylindrical member 101 is fixedly screwed at its upper end portion to the front end portion, that is, the swing end portion, of the swing member 98. A pressing member 102 is disposed within the cylindrical member 101 such that the outer circumference thereof is surrounded by the cylindrical member 101. A restriction portion 101a for limiting the downward movement of the pressing member 102 is provided at the lower end portion of the cylindrical member 101. The pressing member 102 clamps the disk 26 mounted on the support wheel 81 in cooperation with the support wheel, a cyindrical portion 102a being formed at the rear opposite the disk pressing surface, that is, the upper surface, of the pressing member 102. The swing member 98 is arranged in opposition to the upper surface of the pressing member 102.

A spherical bearing member 104 made of steel is inserted through the cylindrical portion 102a formed at the pressing member 102. A circular opening portion 98a, having a diameter smaller than that of the bearing member 104, is formed in the swing member 98.

An engagement pin 106 slidably engaged at its end portion with a support portion 18g is formed in the rear-end portion of the plate 35 constituting a part of the movable member 33, the support portion 18g being formed in the horizontal chassis 18 at its right-end portion and extending linearly in the forward/backward direction. The right-end portion of the swing, member 98 is downwardly bent, and a cam portion 98b slidably engaged with the engagement pin 106 is provided at the bent portion. The cam portion 98b has a rear/upward tapered portion so that the swing member 98 is caused to swing as the engagement pin 106 moves in te forward/backward direction. The cam portion 98b engages with the engagement pin 106 at a position in the vicinity of the support portion 18g. Thus, the engagement position of the cam portion 98b with the engagement pin 106 is set to a position very close to the support portion 18g so that the force of the coil spring 100 acting on the swing member 98 is primarily exerted on the support portion 18g. Accordingly, little load is applied to the movable member 33 and the slide base 22 operate smoothly. The engagement pin 106 is constituted by a pin body 106a and a pair of rollers 106b and 106c rotatably attached on the end portion of the pin body 106a and engaged with the support portion 18g and the cam portion 98b, respectively. The provision of this pair of rollers 106b and 106c reduces the resistance force during relative movement between the engagement pin 106 and each of the support portion 18g and the cam portion 98b so that the movable member 33 and the swing member 98 operate smoothly and so that the service lives of the engagement pin 106, etc., are extended.

A clamp mechanism for clamping the disk 26 conveyed into the play position is constituted by the swing member 98, the coil spring 100, the pressing member 102, etc.

Detection signals generated by the detection switches 55, 56, 58 and 69 are applied to a control portion 110 fixedly provided on the under surface of the horizontal chassis 18. The motors 41 and 74 and the spindle motor 82 are caused to operate at predetermined times (described below in more detail) by an operation signal transmitted from the control portion 110 in response to the detection signals.

Figure 24:
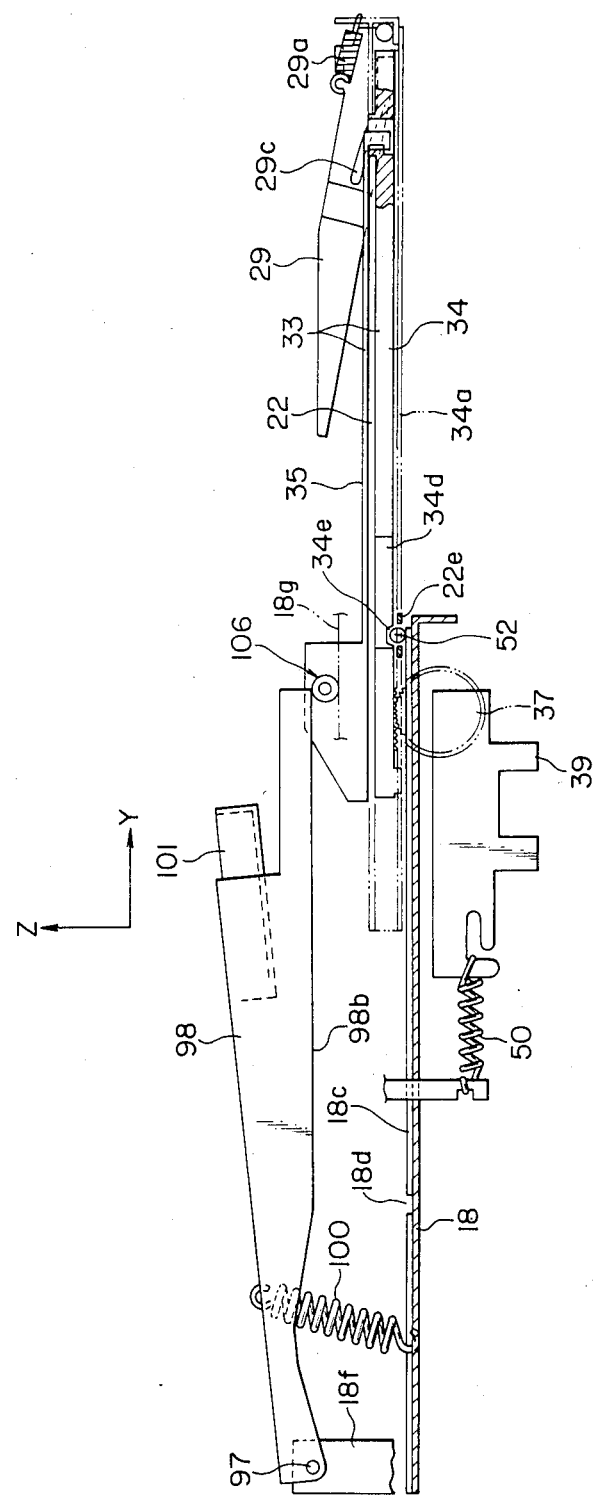

Next, referring to FIGS. 24 and 25, the operation of the front loading disk player of the invention will be described.

First, a disk 26 is inserted into the cylindrical recess portion 23b of the tray 21 projected from the housing 6 as shown in FIG. 3 and mounted on the disk mounting surface 29e of the container 29. The operation projecting the disk carrying portion constituted by the tray 21 and the container 29 from the housing 6 is performed in reverse to the receiving operation (which will be described below).

After the disk 26 has been mounted, a loading button of the operation portion 16 shown in FIG. 4 is depressed. Thus, the motor 41 starts to rotate, causing the gear 37 to rotate and the movable member 33 constituted by the rack member 34 and the plate 35 to be driven backwardly. As shown in FIG. 24, however, the movable member 33 cannot move relative to the tray member 21 constituted by the slide base 22 and the cover member 23 because the movable member 52 inserted into the opening portion 22f formed in the expansion portion 22e of the slide base 22 is engaged with the second recess portion 34e formed in the rack member 34 so that the container 29 is locked to the tray 21. Accordingly, the rotation of the gear 37 only causes the movable member 33 and the tray 21 to move backwardly. The movable member 52 rolls on the slide portion 18c as the tray 21 moves backwardly while retaining the engagement with the second recess portion 34e.

Description will now be given as to a case where the disk has been inserted incorrectly or the like, stopping the backward movement of the tray 21, or a case where an abnormal load is applied to thereby prevent the tray 21 from being retracted.

If any force preventing the disk from being received is applied, the bracket 39 carrying the gear 37 is caused to move forward due to reaction force with respect to the force driving the movable member 33. The forward movement of the bracket 39 causes the bent portion 39a formed on the bracket 39 to engage with the detection switch 55 to actuate the same. On the other hand, the detection switch 56 is not actuated because the container 29 is in its upper swing position. In response to the actuation of only the detection switch 55, the control portion 110 is actuated to indicate that an abnormal load has been applied. The motor 41 is then caused to reversely operate.

If the backward movement of the movable member 33 and the tray 21 is continued without application of the above-mentioned abnormal load, the tray 21 reaches the predetermined receiving position within the housing 6, and the rear end of the slide base 22 comes into contact with the restriction protrusion 53 provided at the rear end portion of the horizontal chassis 18 to assume the state as shown in FIGS. 12 and 25. At this time, as is apparent from FIG. 25, the first recess portion 18d, the second recess portion 34e, and the opening portion 22f come into coaxial opposition. Since the backward driving force is still applied to the member 33 and the slide base 22 has been stopped by the restriction protrusion 53, the movable member 52 is moved away from the second recess portion 34e and enters the first recess portion 18d formed in the horizontal chassis 18. Thus, the tray 21 is locked to the horizontal chassis 18 while at the same time the locked state of the movable member 33 to the tray 21, that is, the locked state of the container 29 to the tray 21, is released. Thus, backward movement of the movable member 33 is permitted until the state shown in FIG. 14 has been reached. That is, the engagement protrusion 34c formed on the rack member 34 of the movable member 33 slides along the cam hole 29c formed in the container 29 and the container 29 swings down while carrying the disk. Accordingly, that center hole of the disk 26 is fitted with the movable portion 81b of the support wheel 81 so that the disk 26 is mounted on the support wheel. At this time, the disk mounting surface 29e of the container 29 is separated from the disk and the disk 26 is made rotatable together with the support wheel 81.

As shown in FIG. 14, on the other hand, the swing member 98 with its cam portion 98b engaged with the engagement pin 106 projectingly provided on the plate 35 of the movable member 33 is swung down by the force of the coil spring 100 as the container 29 swings down and the pressing member 101 provided at the swing end portion of the swing member is pressed by the disk so that the disk 26 is clamped.

Figure 17:
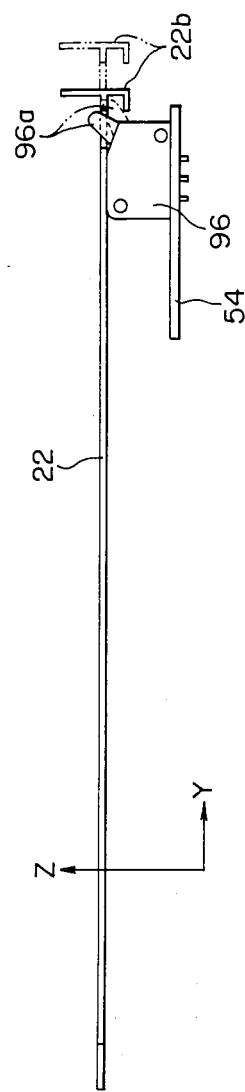
Figure 18:
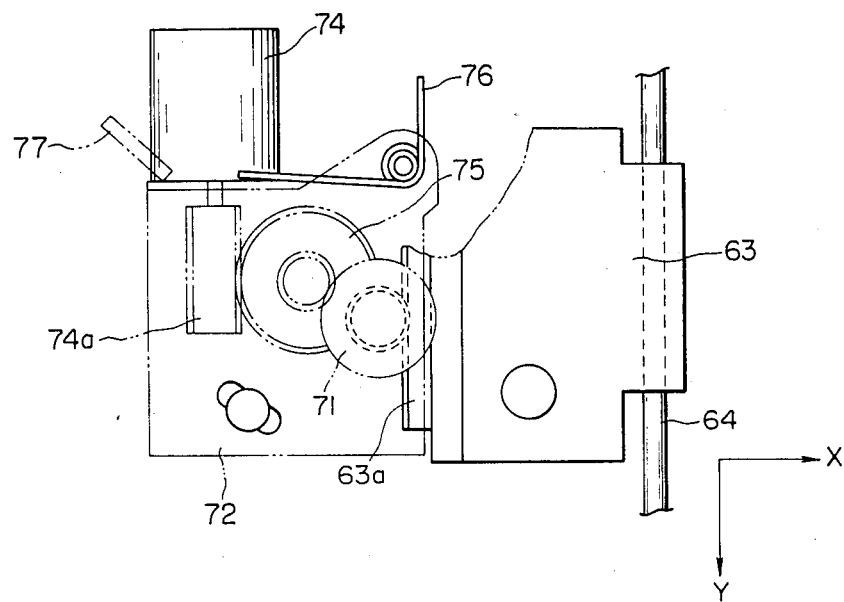
Figure 19:
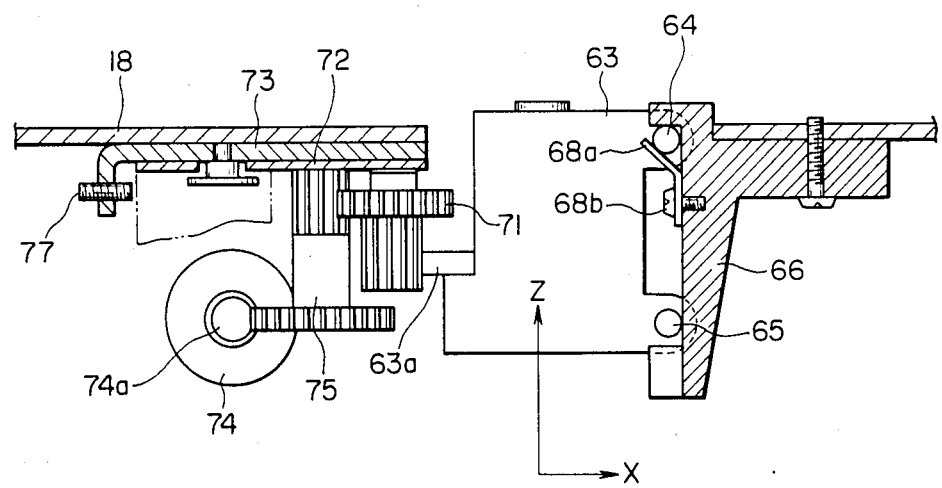
Figure 20:
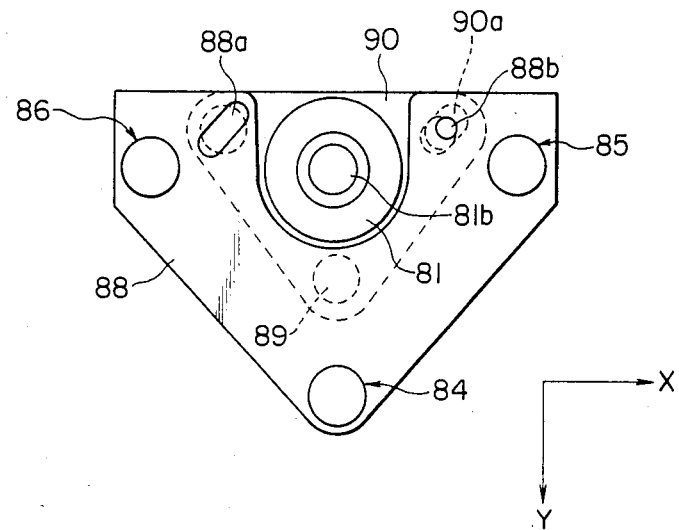
Figure 21:
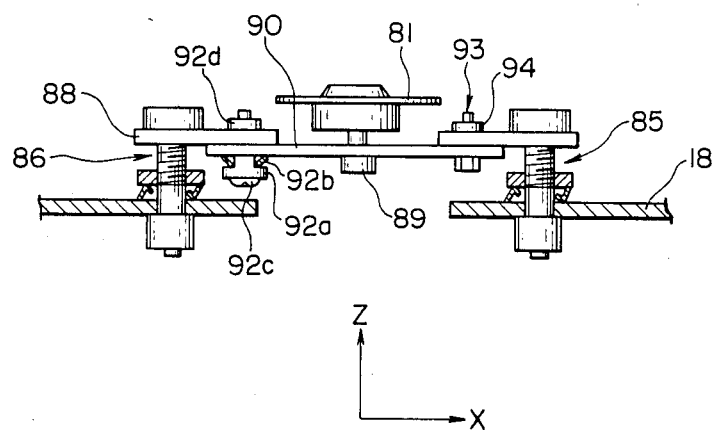
Figure 22:
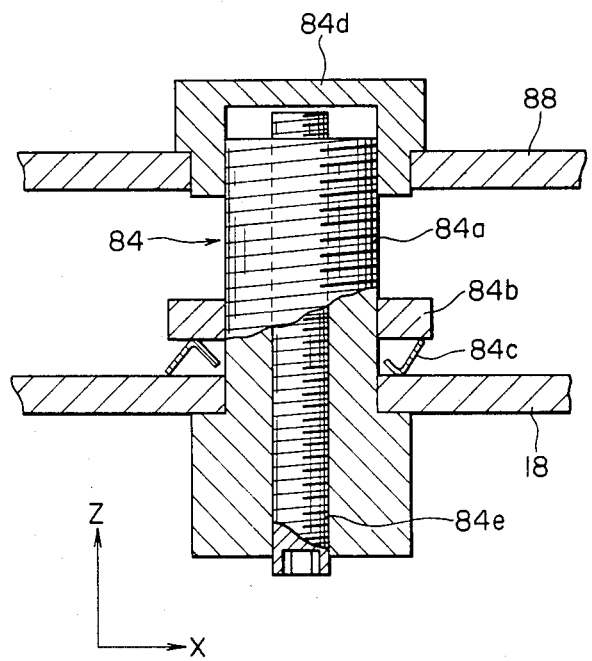
Figure 23:
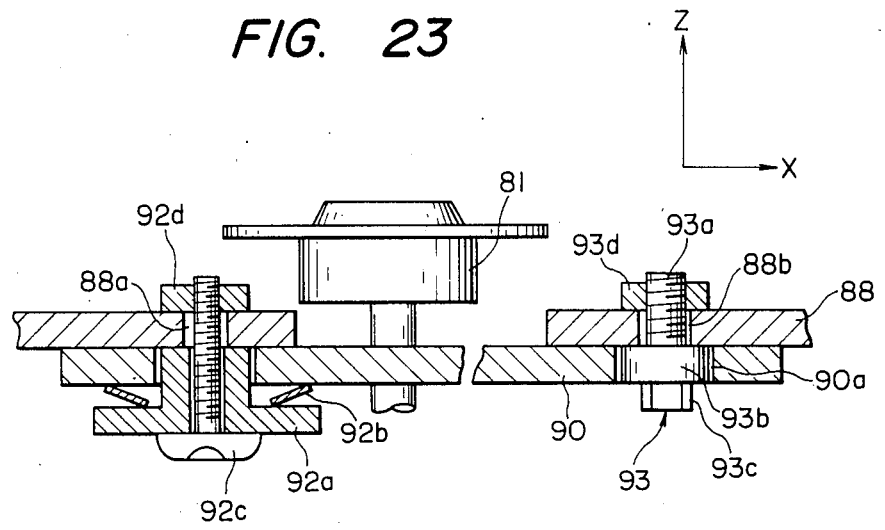

When the movable member has reached the limit of backward movement, the bracket 39 is moved forward by the reaction of the force driving the movable member 33 so that the detection switch 55 operates. At this time, the detection switch 56 is operated by the downward swing of the container 29, and the control portion 110 indicates, in response to the detection of the actuated state of both the detection switches 55 and 56, that the disk 26 has reached the play position and stops the motor 41. Further, as shown in FIG. 17, the engaged state between the actuator 96a of the irradiation stop switch 96 and the under surface of the slide base 22 is released at the same time as the tray 21 (including the slide base 22) has been received within the housing so that the irradiation stop switch is placed in its ON state and power is supplied to the light emitting device of the optical pickup.

Upon generation of an operation signal for play, the spindle motor 82 rotates and at the same time the carriage 63 starts to operate to thereby start the play.

When play ends and the detection switch 69 detects the arrival of the carriage 63 at the movement limit position, the carriage 63 and the support wheel 81 are stopped and at the same time the motor 41 starts the reverse operation. Accordingly, as previously described, the tray 21 and the container 29 are projected from the housing 6 through a process the reverse of that described above. Immediately before the tray 21 projects from the housing 6, the detection switch 58 is actuated so that the tray is stopped correctly at its projected position. Thus, the disk is withdrawn.

As described above in detail, the operation changeover mechanism (lock/release mechanism) has a simple arrangement constituted by a first recess portion (18d) and a second recess portion (34e) formed in a first member 33), respectively, an opening portion (22f) formed in a third member (tray 21) at a portion (expansion portion 22e) of the third member disposed between the first and second members, a movable member (52) disposed within the opening portion and arranged to be engageable with the first and second recess portions, etc. This mechanism is inexpensive and the assembly thereof is easy.

Referring now to FIG. 26, a further embodiment of the optical information recording disk player according to the present invention will be described hereunder.

In FIG. 26, a chassis 521 is fixed to a housing (not shown) of the player. On the under surface of the chassis 521 there is suspended a subchassis 523 through float springs 522 acting as vibration absorbers. Here, the chassis 521 is referred to as a first support member and the subchassis 523 is referred to as a second support member. On the subchassis 523 there is fixedly provided a spindle motor 526 carrying a turntable 525 for mounting thereon a disk 524 to be played, and there is also provided a carriage 527 carrying an optical pickup (not shown), the carriage being movable in the radial direction of the disk and being driven.

On an upward extending bracket portion 529 formed at an end portion of the subchassis 523 (which is the second member) there is provided a movable member 531 swingable around a pin 530, that is, moveable relative to the turntable 525. The movable member 531 is biased by a coil spring (not shown) in a direction such as to cause the swing end thereof to approach the turntable 525. On the swing end of the movable member 531, a cylindrical member 533 is fixed at its upper end by screws. In the cylindrical member 533, there is disposed a pressing member 534 having an outer periphery surrounded by the cylindrical member. A restriction portion 535 for limiting the downward movement of the pressing member 534 is formed at the lower end portion of the cylindrical member 533. The pressing member 534 serves to clamp the disk 524 mounted on the turntable 525 in cooperation with the turntable 525, and a spherical bearing member 537 is attached at the rotating center of the rear surface opposite the disk, that is, the upper surface, of the pressing member 534. A receiving member 538 is fixedly attached to the movable member 531 corresponding to the bearing member 537.

A clamp mechanism for clamping the disk 524 positioned in its play position, that is, on the turntable 525, is constituted by the above-mentioned movable member 531, a coil spring (not shown) for biasing the movable member 531 toward the turntable 525, the pressing member 534, etc. On the chassis 521, though not shown in the drawing, there is provided a disk conveying mechanism for carrying the disk 524 at a predetermined position outside the housing and automatically conveying the disk to the play position.

Though the movable member 531 is swingably attached to the subchassis 523, the movement thereof is not limited to swinging movement, and the movable member 531 may be, alternatively, arranged to perform, for example, parallel movement in the direction perpendicular to a main surface of the subchassis 523.

As described above, in an optical information recording disk player according to the present invention, a clamp mechanism is supported by the housing through a vibration absorbing structure and mounted on a second support member on which the pickup and spindle motor are fixedly mounted. That is, the relative movement between the clamp mechanism and the spindle motor, and hence the turntable, is prevented. Therefore, the dimension Gb indicated in FIG. 26, that is, a gap which is formed in the pressing member in order to release the support condition of the pressing member 512 by the movable member 531 to thereby enable the pressing member together with the turntable in the play mode of the disk, can be made much smaller than the corresponding gap in the conventional optical information recording disk player. Consequently, it becomes easy to make the player thin overall, and at the same time, it is possible to simplify the mechanism of the pressing member.

Figure 1A:
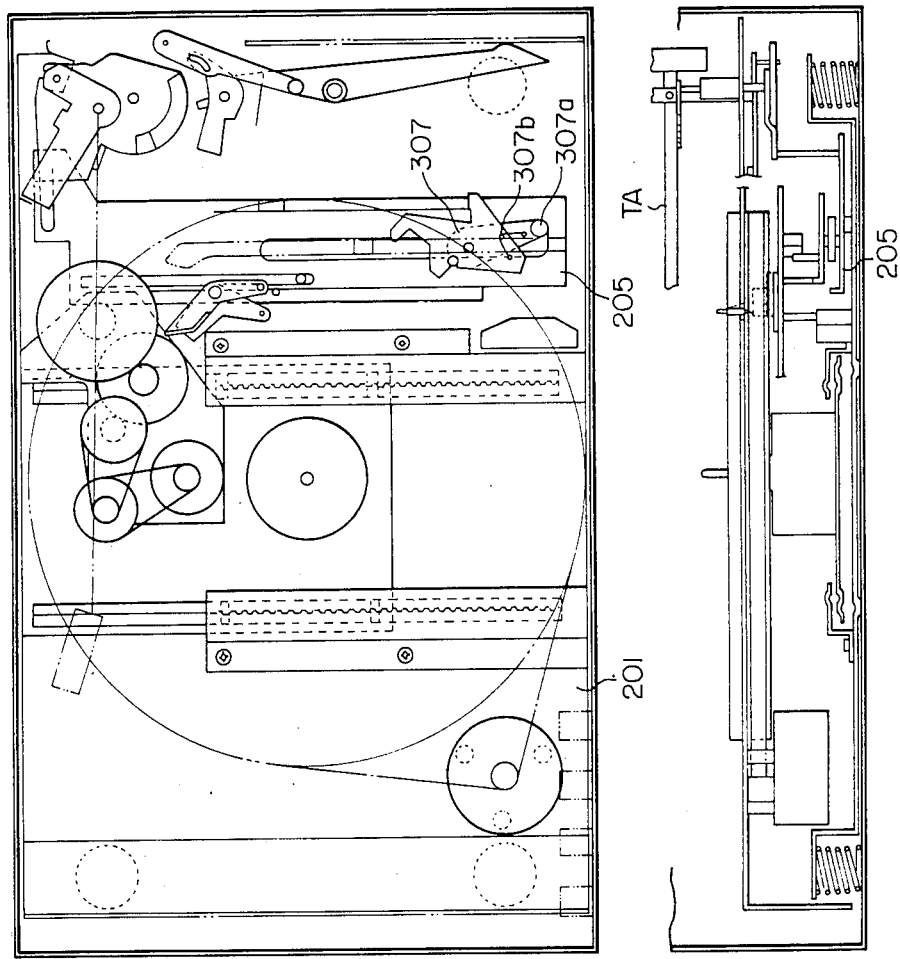
Figure 2:
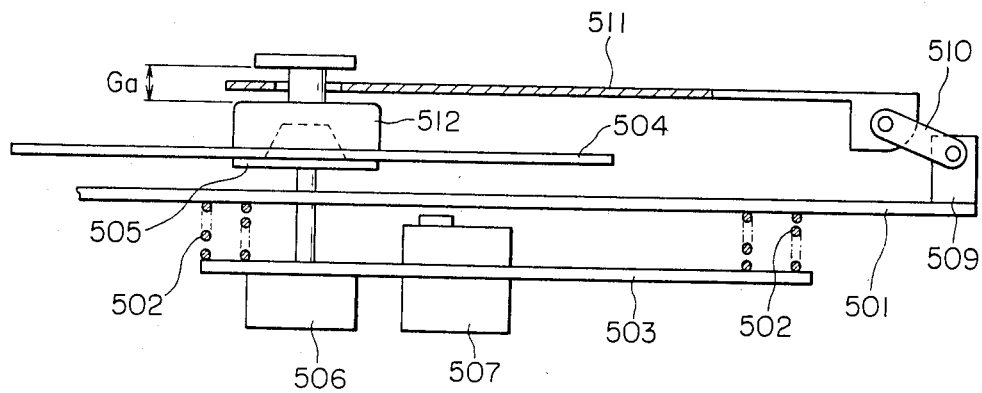

In the optical information recording disk player according to the present invention arranged as described above, sufficient dimensional accuracy in relative positions between the turntable and the pressing member can be attained even if the dimensional accuracy in the position of the spindle motor and the clamp mechanism on the second support portion and the accuracy in manufacturing these components are not high; thus, the cost of the player is reduced. Further, since members such as the connecting member 510 shown in FIG. 2 become unnecessary, there is a further reduction in cost.

We claim:

1. In a front loading recorded disk playing apparatus having a housing with an opening in a front panel, a chassis within said housing on which operational electrical apparatus and mechanical apparatus are mounted, a record carrying means for supporting a record disk, said record carrying means being adapted to move between a first position within said housing and a second position extended from said housing, said record carrying means being mounted to said chassis by an extendable track apparatus which is adapted to support said record carrying means in its first position and its second position, the improvement comprising:

a stationary base means, said stationary base means being mounted on and stationary with respect to said chassis in a first planar direction, said stationary base further comprising a first rail means integrally formed with said base means and aligned in the direction of movement of said record carrying means between its first and second positions, said first rail means further including a first recess means;

an extendable rail means, said extendable rail means having a second rail means aligned in the direction of movement of said record carrying means between its first and second positions, said second rail means further including a second recess means;

a moveable base means, said moveable base means forming a part of said record carrying means and being at least partly disposed between the first rail means and the second rail means and said moveable base means being adapted for slidable movement relative to said first and second rail means as said record carrying means moves between its first and second positions, said moveable base further including an opening therein;

a detent means, said detent means being contained within the opening in said moveable base means;

said first recess of said first rail means, said second recess of said second rail means and said opening of said moveable base means being in alignment when said record carrying means is in said first position and said first and second recess means being adapted to resistively contain said detent means whereby said moveable base means is locked with respect to said said second rail means and relative movement between said moveable base means and said first rail means is allowed until said record carrying means arrives at said first position, and after said arrival of said record carrying means at said first position, relative movement between said second rail means and said moveable base means is allowed and said moveable base means is locked with respect to said first rail means.

2. The improvement, as claimed in claim 1, wherein a distance between respective opposite faces of said first rail means and said second rail means within a range of movement of said moveable base means is smaller than an outer dimension of said detent means, and a distance between a bottom face of said first recess portion and a face of said second rail means and a distance between a bottom face of said second recess portion and a face of said first rail means are slightly larger than said outer dimension of said detent means.

3. The improvement, as claimed in claim 2, further comprising restriction means for restricting relative movement in one predetermined direction between said moveable base means and either one of said first rail means and said second rail means.

4. The improvement, as claimed in claim 1, wherein said stationary base means is said chassis, that is, said first rail means is formed integrally with said chassis.

5. The improvement, as claimed in claim 1, wherein said detent means is spherical in shape.

6. The improvement, as claimed in claim 1, wherein said detent means is cylindrical in shape.

7. The improvement, as claimed in any one of claims 1, 5 and 6 in which at least one of said first and second recess means is trapezoidal in cross section.

8. The improvement, as claimed in any one of claims 1, 5 and 6 in which at least one of said first and second recess means is channel-like.

* * * * *